US012397234B2

(12) United States Patent
Sugihara et al.

(10) Patent No.: US 12,397,234 B2
(45) Date of Patent: Aug. 26, 2025

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Hidenori Sugihara, Tokyo (JP); Masayuki Nagata, Tokyo (JP); Naoki Nishikawa, Tokyo (JP); Akihito Isayama, Tokyo (JP)

(73) Assignee: CYGAMES, INC., Tokyo (JP)

( * ) Notice: Subject to any disclaimer, the term of this patent is extended or adjusted under 35 U.S.C. 154(b) by 397 days.

(21) Appl. No.: 18/069,494

(22) Filed: Dec. 21, 2022

(65) Prior Publication Data

US 2023/0128425 A1 Apr. 27, 2023

Related U.S. Application Data

(63) Continuation of application No. PCT/JP2021/023947, filed on Jun. 24, 2021.

(30) Foreign Application Priority Data

Jun. 29, 2020 (JP) ................. 2020-111285

(51) Int. Cl.
*A63F 13/00* (2014.01)
*A63F 13/58* (2014.01)

(52) U.S. Cl.
CPC .................. *A63F 13/58* (2014.09)

(58) Field of Classification Search
CPC .......... A63F 13/58; A63F 13/46; A63F 13/35; A63F 13/69
See application file for complete search history.

(56) References Cited

U.S. PATENT DOCUMENTS

2013/0324266 A1* 12/2013 Takagi ................. A63F 13/45
463/43

FOREIGN PATENT DOCUMENTS

| JP | 5204330 B1 | 6/2013 |
| JP | 2020037026 A | 3/2020 |
| JP | 2020044154 A | 3/2020 |

OTHER PUBLICATIONS

Office Action issued in Japanese Application No. 2020-111285; Dated Mar. 23, 2021 (4 pages).
International Search Report issued in International Application No. PCT/JP2021/023947, mailed Sep. 14, 2021 (6 pages).
Written Opinion issued in International Application No. PCT/JP2021/023947; Dated Sep. 14, 2021 (3 pages).

* cited by examiner

*Primary Examiner* — Thomas H Henry
(74) *Attorney, Agent, or Firm* — Osha Bergman Watanabe & Burton LLP

(57) ABSTRACT

A non-transitory computer readable medium stores a program causing a computer to execute: setting an upper limit value for a parameter of a game object in accordance with a specific condition; changing the parameter within the upper limit value serving as a limit; and assigning, upon the satisfaction of a prescribed condition, a privilege with which it is possible to change the parameter of the game object up to a specified value on advantageous terms even in the case where the specified value exceeds the upper limit value.

14 Claims, 34 Drawing Sheets

| Free enhancement ID | Character level | Equipment rank | Stars (rarity) |
|---|---|---|---|
| 1 | 100 | 10 | — |
| 2 | 150 | 15 | — |
| 3 | 200 | 20 | — |
| 4 | 100 | 10 | 3 |
| 5 | 100 | 10 | 4 |
| 6 | 150 | 15 | 3 |
| 7 | 150 | 15 | 4 |

FIG.13A

| Ally character ID | Character level | Equipment rank | Stars (rarity) |
|---|---|---|---|
| 1 | 150 | 15 | 5 |
| 2 | 150 | 15 | 5 |
| 3 | 150 | 15 | 5 |
| 4 | 150 | 15 | 3 |
| 5 | 150 | 15 | 4 |
| 6 | 150 | 15 | 3 |
| 7 | 10 | 2 | 3 |

| Free enhancement IDa | Free enhancement IDb |
|---|---|
| — | — |
| — | — |
| — | — |
| — | — |
| — | — |
| — | — |
| 3 | 4 |

FIG.13B

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2021/023947, filed on Jun. 24, 2021, which claims priority to Japanese Patent Application No. 2020-111285, filed on Jun. 29, 2020, the entire contents of which are incorporated by reference herein.

BACKGROUND ART

Technical Field

The present invention relates to information processing programs, information processing methods, and information processing systems.

For example, Patent Literature 1 discloses a game in which a level upper limit (upper limit value) is provided for a character, and by using a prescribed item, the level of the character can be advanced within the level upper limit serving as a limit.

CITATION LIST

Patent Literature

Patent Literature 1: JP 2020-037026 A

SUMMARY OF INVENTION

Technical Problem

Meanwhile, a game in which an item with which the level can be advanced up to a prescribed value is provided has been proposed. In the case where the level upper limit of a character is lower than the prescribed value in such a game, it is possible to advance the level of the character only up to the level upper limit even when the item is used. Therefore, there is concern that a player might experience a sense of loss such as the player not being able to advance the character up to the prescribed value.

It is an object of the present invention to provide an information processing program, an information processing method, and an information processing system that make it possible to alleviate a sense of loss that experienced by a player.

Solution to Problem

In order to solve the problem described above, an information processing program causes a computer to function as: an upper-limit-value setting unit that sets an upper limit value for a parameter of a game object in accordance with a specific condition; a parameter change unit that changes the parameter within the upper limit value serving as a limit; and a privilege assignment unit that, upon the satisfaction of a prescribed condition, assigns a privilege with which it is possible to change the parameter of the game object up to a specified value on advantageous terms even in the case where the specified value exceeds the upper limit value.

The privilege assignment unit may make it possible to change the parameter of the game object up to the specified value when, as the satisfaction of the prescribed condition, a prescribed game item has been used for the game object.

The privilege assignment unit may make it possible to change the parameter of the game object up to the specified value corresponding to an effect of the game item.

Upon the satisfaction of the prescribed condition, the privilege assignment unit may make it possible to change the parameter of the game object up to the specified value for free.

Upon the satisfaction of the prescribed condition, the privilege assignment unit may assign an item that is needed for changing the parameter of the game object up to the specified value.

In order to solve the problem described above, an information processing method includes: a step of setting an upper limit value for a parameter of a game object in accordance with a specific condition; a step of changing the parameter within the upper limit value serving as a limit; and a step of assigning a privilege with which it is possible to change the parameter of the game object up to a specified value on advantageous terms even in the case where the specified value exceeds the upper limit value.

In order to solve the problem described above, an information processing system includes: an upper-limit-value setting unit that sets an upper limit value for a parameter of a game object in accordance with a specific condition; a parameter change unit that changes the parameter within the upper limit value serving as a limit; and a privilege assignment unit that, upon the satisfaction of a prescribed condition, assigns a privilege with which it is possible to change the parameter of the game object up to a specified value on advantageous terms even in the case where the specified value exceeds the upper limit value.

Effects of Disclosure

The present invention makes it possible to alleviate a sense of loss experienced by a player.

BRIEF DESCRIPTION OF DRAWINGS

FIG. 13A is a figure for explaining a free enhancement ID database.

FIG. 13B is a figure for explaining an ally character database.

DESCRIPTION OF EMBODIMENTS

An aspect of an embodiment of the present invention will be described below in detail with reference to the accompanying drawings. The dimensions, materials, other numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
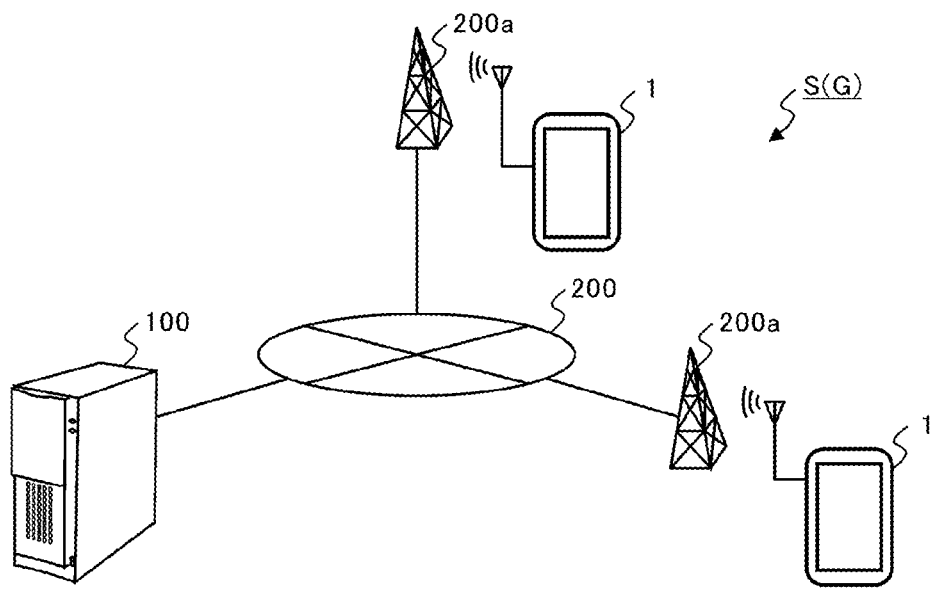
FIG. 1 is an explanatory illustration schematically showing the configuration of an information processing system.

FIG. 1 is an explanatory illustration schematically showing the configuration of an information processing system S. The information processing system S is what is called a client-server system including player terminals 1, a server 100, and a communication network 200 having communication base stations 200a.

The player terminals (game terminals or information processing devices) 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 accumulates various kinds of information (player information) for each player ID for identifying a player who plays a game.

The communication base stations 200a are connected to the communication network 200, and send information to and receive information from the player terminals 1 in a wireless manner. The communication network 200 is implemented by a mobile phone network, an Internet network, a local area network (LAN), a special circuit, or the like, and realizes wireless or wired communication connection between the player terminals 1 and the server 100.

In the information processing system S in this embodiment, the player terminals 1 and the server 100 function as game devices G. The player terminals 1 and the server 100 individually share roles for controlling the proceeding of the game, and it becomes possible to proceed with the game through cooperation between the player terminals 1 and the server 100.

(Hardware Configurations of Player Terminals 1 and Server 100)

Figure 2A:
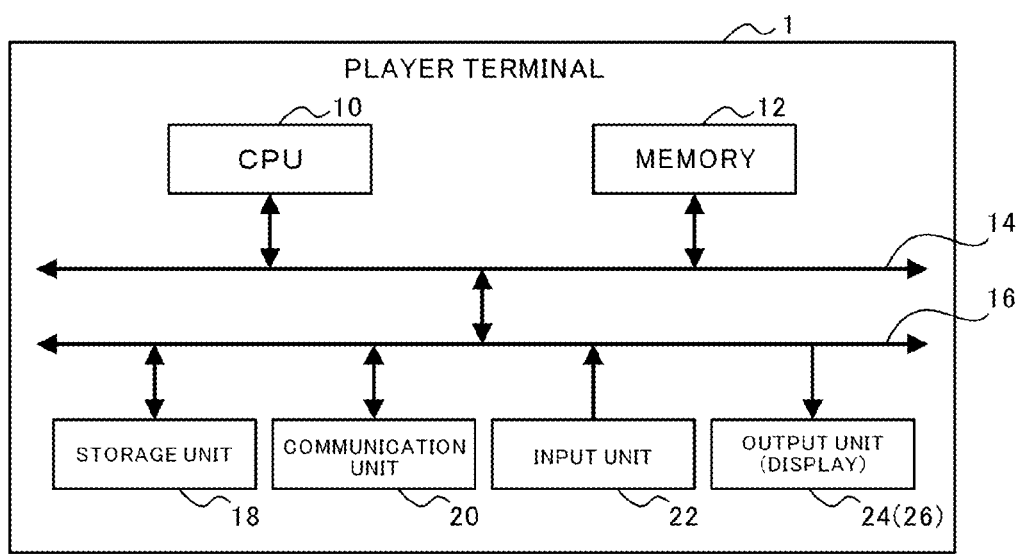
FIG. 2A is a diagram for explaining the hardware configuration of a player terminal.
Figure 2B:
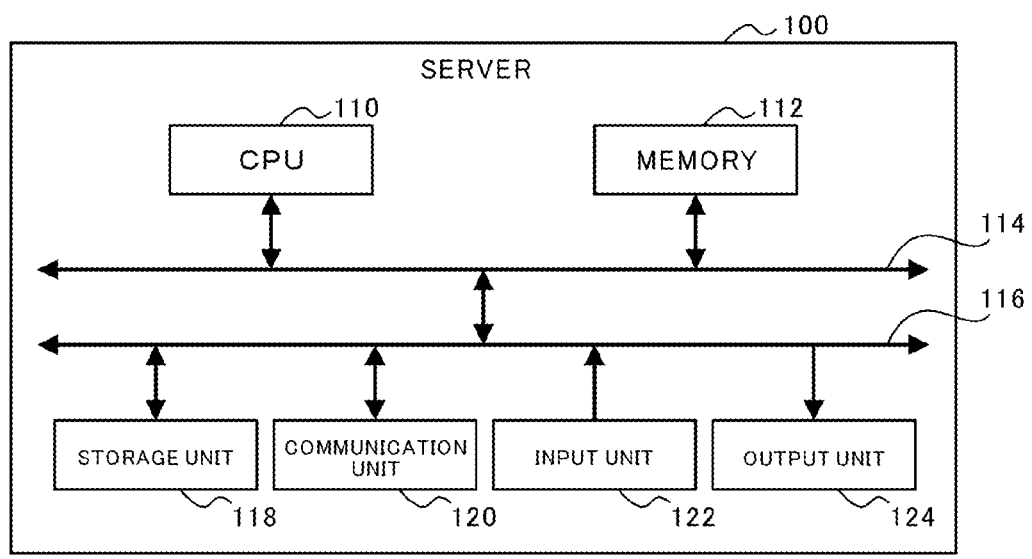
FIG. 2B is a diagram for explaining the hardware configuration of a server.

FIG. 2A is a diagram for explaining the hardware configuration of a player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 100.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station 200a in a wireless manner, and sends information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touch panel, buttons, a keyboard, a mouse, a cross keypad, or an analog controller. Alternatively, the input unit 22 may be a special controller provided at the player terminal 1 or connected (externally) to the player terminal 1. Alternatively, the input unit 22 may be configured of an acceleration sensor that detects tilting or movement of the player terminal 1 or a microphone that detects the player's voice. That is, examples of the input unit 22 include a wide range of devices that enable the input of the player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24 and includes a touch panel as the input unit 22, the touch panel being provided so as to be stacked on the display 26.

(Game Specifics)

Next, the specifics of the game provided by the information processing system S (game device G) in this embodiment will be described by using an example. In this embodiment, what are called battle games, in which ally characters play battles against enemy characters, are provided. Specifically, in the game in this embodiment, a plurality of ally characters are provided. The player forms a party by selecting a plurality of (five here) ally characters from the provided ally characters. Furthermore, the player can play a plurality of kinds of battle games involving different enemy characters or having different difficulty levels. The objective of a battle game is that the ally characters formed into the party beat (clear) the enemy characters to acquire rewards.

Figure 3A:
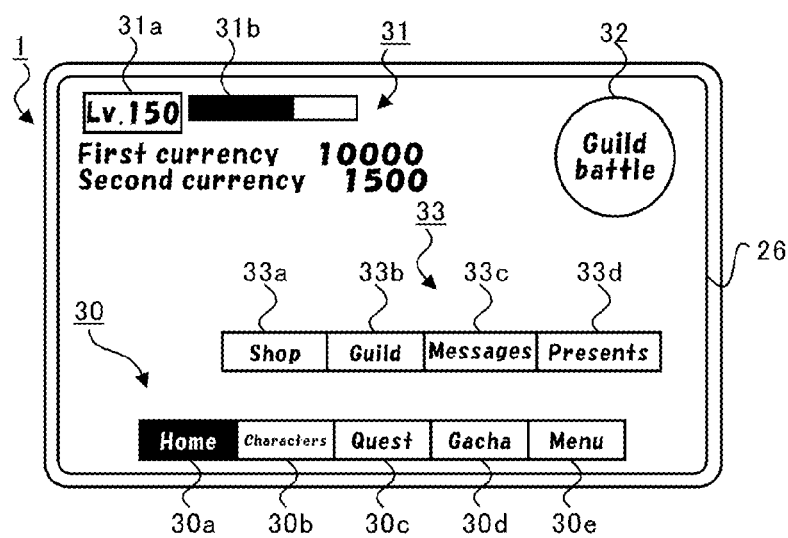
FIG. 3A is an illustration for explaining an example home screen.
Figure 3B:
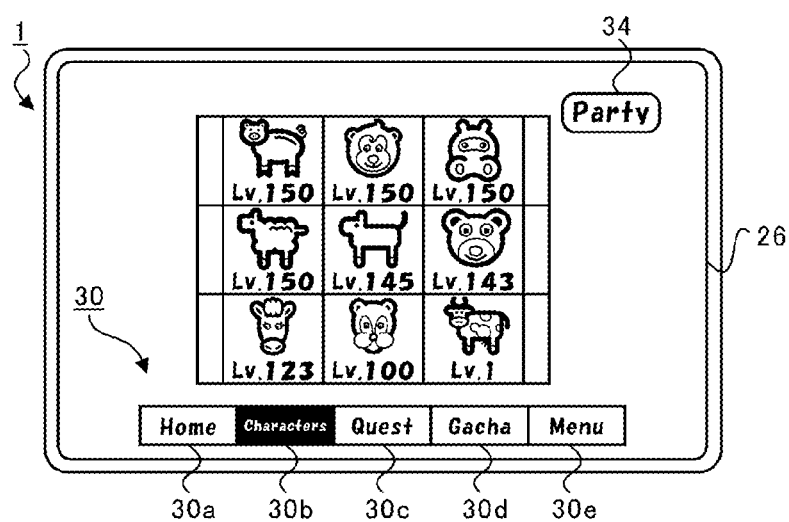
FIG. 3B is an illustration for explaining an example ally-character confirmation screen.
Figure 3C:
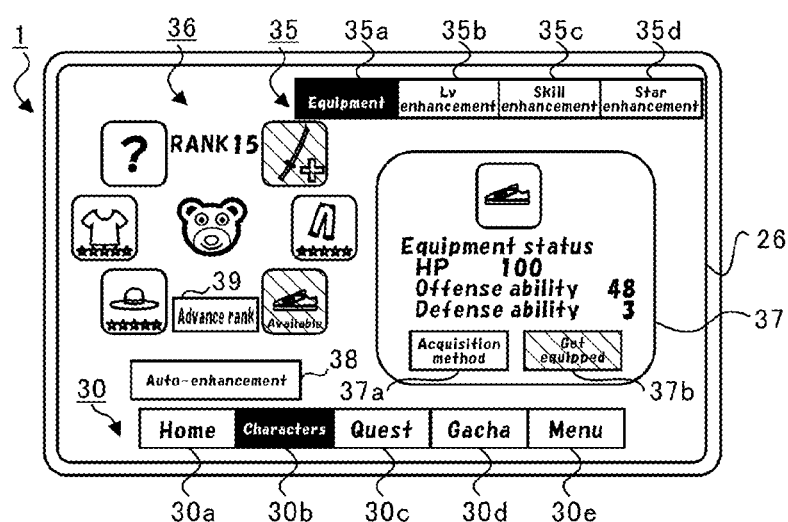
FIG. 3C is a first illustration for explaining an example ally-character detail screen.
Figure 4A:
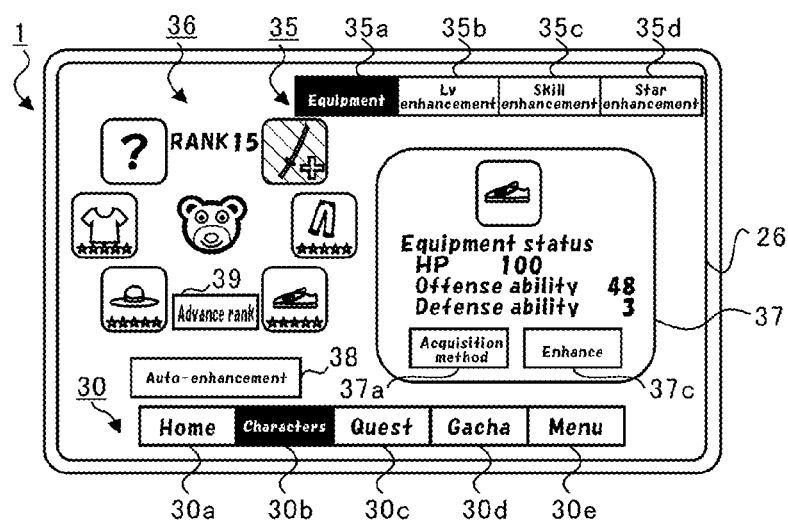
FIG. 4A is a second illustration for explaining an example ally-character detail screen.
Figure 4B:
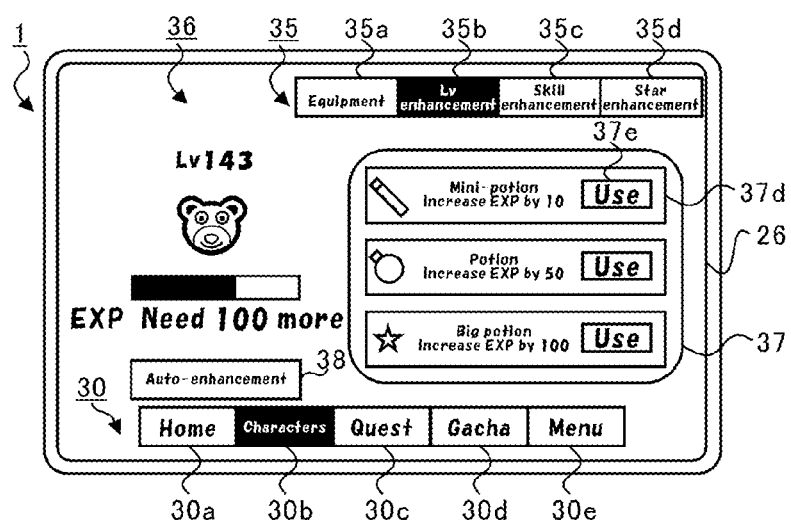
FIG. 4B is a third illustration for explaining an example ally-character detail screen.
Figure 4C:
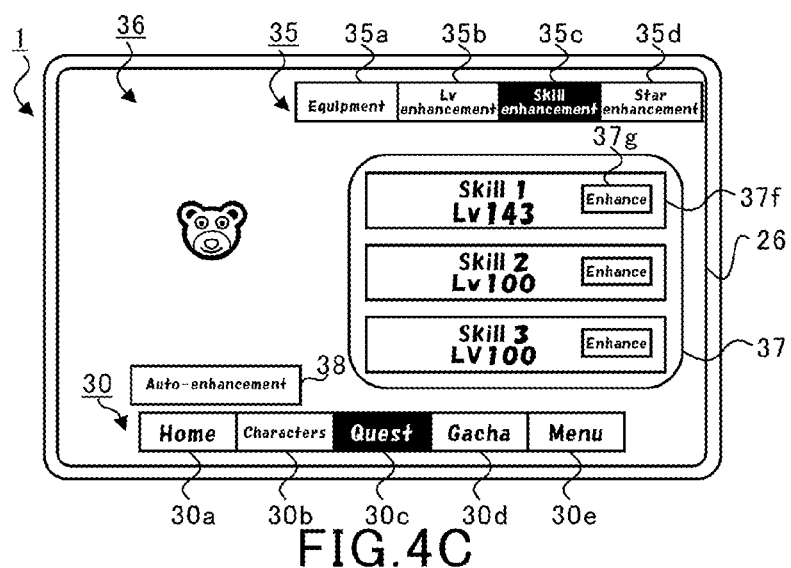
FIG. 4C is a fourth illustration for explaining an example ally-character detail screen.
Figure 5:
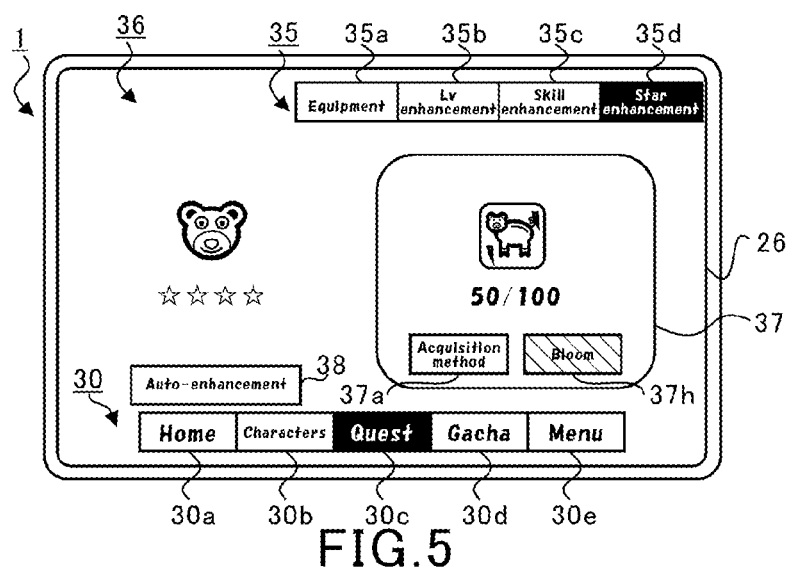
FIG. 5 is a fifth illustration for explaining an example ally-character detail screen.

FIG. 3A is an illustration for explaining an example home screen. FIG. 3B is an illustration for explaining an example ally-character confirmation screen. FIG. 3C is a first illustration for explaining an example ally-character detail screen. FIG. 4A is a second illustration for explaining an example ally-character detail screen. FIG. 4B is a third illustration for explaining an example ally-character detail screen. FIG. 4C is a fourth illustration for explaining an example ally-character detail screen. FIG. 5 is a fifth illustration for explaining an example ally-character detail screen. The display 26 of the player terminal 1 displays game screens. In this embodiment, the game screens are broadly classified into normal screens and battle screens.

The normal screens are mainly screens for allowing the player to make various kinds of settings and to confirm information. Meanwhile, the battle screens are screens that are displayed on the display 26 from the start to the end of a battle game. Here, all the screens other than the battle screens are the normal screens. A plurality of screens are provided as the normal screens, such as the home screen shown in FIG. 3A, the ally-character confirmation screen shown in FIG. 3B, a quest screen (see FIG. 6A), a shop screen (not shown), a guild screen (not shown), a gacha screen (see FIG. 8A), and a menu screen (not shown).

In the normal screens, for example as shown in FIG. 3A, a menu bar 30 is displayed in a lower part of the display 26. In the menu bar 30, a plurality of operating parts that can be operated (tapped) by the player are provided. In the menu bar 30, the following operating parts are provided: a home-screen selection operating part 30a labelled as "Home"; an ally-character-confirmation-screen selection operating part 30b labelled as "Characters"; a quest-screen selection operating part 30c labelled as "Quest"; a gacha-screen selection operating part 30d labelled as "Gacha"; and a menu-screen selection operating part 30e labelled as "Menu".

Figure 6A:
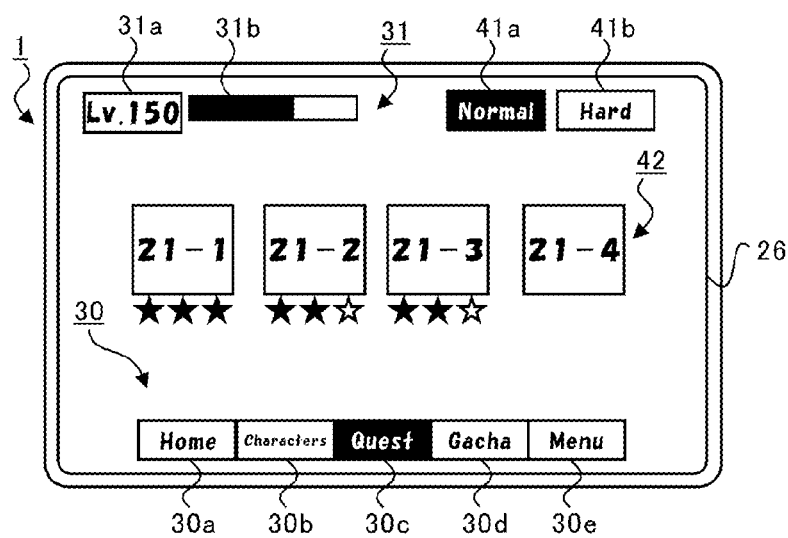
FIG. 6A is an illustration for explaining an example quest screen for a normal quest.
Figure 8A:
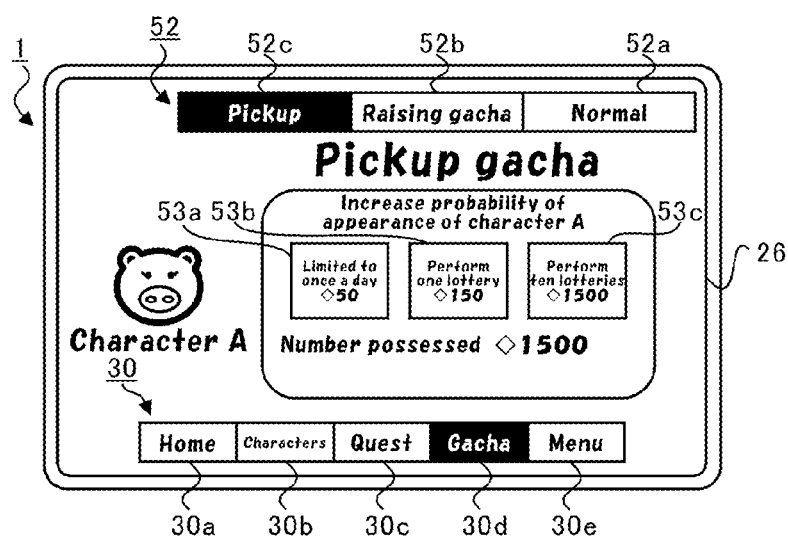
FIG. 8A is an illustration for explaining an example gacha screen.

When the home-screen selection operating part 30a is tapped, the home screen shown in FIG. 3A is displayed on the display 26. Furthermore, when the ally-character-confirmation-screen selection operating part 30b is tapped, the ally-character confirmation screen shown in FIG. 3B is displayed on the display 26. Similarly, when the quest-screen selection operating part 30c is tapped, the quest screen shown in FIG. 6A is displayed on the display 26. Furthermore, when the gacha-screen selection operating part 30d is tapped, the gacha screen shown in FIG. 8A is displayed on the display 26. Furthermore, when the menu-screen selection operating part 30e is tapped, a menu screen is displayed on the display 26. Although not described in detail, it is possible to make settings for the game and to confirm various kinds of information via the menu screen.

In the menu bar 30, the operating part corresponding to each screen is indicated in a highlighted manner so that the screen being displayed on the display 26 can be distinguished.

The home screen shown in FIG. 3A corresponds to an initial screen, and a header display area 31 is provided in an upper part thereof. In the header display area 31, the following items of information are displayed: level information 31a indicating the player level associated with the player ID; a stamina display bar 31b indicating the stamina of the player associated with the player ID; and the possessed amounts of a first currency and a second currency, associated with the player ID.

The stamina is a parameter necessary for playing a battle game. In this embodiment, a plurality of kinds of battle games are provided, and each of the battle games has set therefor a value of stamina consumption needed for a play, the number of challenges per day, etc. In the case of playing a battle game having set therefor a value of stamina consumption needed for a play, the player has to consume stamina in order to play the battle game, and thus the player cannot play the battle game in the case where the stamina is insufficient.

Although not described in detail, when the player clears a battle game, the player can acquire a prescribed value as a player experience value. Furthermore, the player level is advanced each time the player experience value reaches a certain value. A management upper limit value is set for the player level, which prohibits the player level from being advanced beyond the set management upper limit value even if a player experience value is acquired. The management upper limit value is set by the administrator, and is increased at prescribed timings.

The player level has set therefor a stamina upper limit value, and the stamina upper limit value becomes higher as the player level is advanced. Stamina is recovered by a prescribed value (e.g., one point) per certain time (e.g., five minutes) within the upper limit. In the stamina display bar 31*b*, the current remaining amount of stamina is displayed so as to be visually recognized in relation to the stamina upper value.

The first currency and the second currency are currencies that are available only in the game. For example, when a battle game is cleared, a prescribed amount of the first currency can be acquired in accordance with the cleared battle game. The second currency can be acquired for free or for a fee. Although the first currency and the second currency can be acquired in various ways, detailed descriptions thereof will be omitted.

Furthermore, there are cases where a notification selection operating part 32 is displayed at the right end of the home screen. Although not described in detail, in the case where a guild battle is being played, which is a kind of battle game, a notification selection operating part 32 labelled as "Guild battle" is displayed.

A home menu 33 is displayed between the menu bar 30 and the notification selection operating part 32 in the home screen. In the home menu 33, the following operating parts are provided: a shop-screen selection operating part 33*a* labelled as "Shop"; a guild-screen selection operating part 33*b* labelled as "Guild"; a message-screen selection operating part 33*c* labelled as "Messages"; and a present-screen selection operating part 33*d* labelled as "Presents".

When the shop-screen selection operating part 33*a* is tapped, a shop screen via which items can be purchased, which is not shown, is displayed. Furthermore, when the guild-screen selection operating part 33*b* is tapped, a guild screen, which is not shown, is displayed on the display 26. Furthermore, when the message-screen selection operating part 33*c* is tapped, a message screen displaying update information, maintenance information, etc., which is not shown, is displayed on the display 26. Furthermore, when the present-screen selection operating part 33*d* is tapped, for example, a present screen displaying an item distributed from the administrator, which is not shown, is displayed on the display 26.

In the ally-character confirmation screen shown in FIG. 3B, all the images of the ally characters corresponding to ally character IDs associated with the player ID are displayed. That is, in the ally-character confirmation screen, all the ally characters possessed by the player are displayed. Note that the ally character IDs are provided for the identification of ally characters, and thus different IDs are assigned to the individual ally characters. Furthermore, when the player acquires a new ally character, for example, through a gacha lottery, the ally character ID of the acquired ally character is associated with the player ID of the player.

At the right end of the ally-character confirmation screen, a party-screen selection operating part 34 labelled as "Party" is displayed. When the party-screen selection operating part 34 is tapped, a party formation screen, which is not shown, is displayed on the display 26, which makes it possible to form and save a party constituted of five ally characters at most.

For each character, various parameters are stored in association therewith, such as stars (rarity), an experience value, a character level, a skill level, and an equipment rank. The experience value is increased in the case where a battle game has been won or in the case where a prescribed item has been used, which will be described later. The character level is set in accordance with the experience value, and is advanced each time the experience value reaches a prescribed value. Note that, as a proceeding upper limit value, the player level is set to the character level. Therefore, the character level can be advanced within the player level serving as a limit.

Furthermore, each ally character has set therefor base values of battle abilities, such as life points, an offense ability, and a defense ability, on the basis of the stars (rarity) and the character level. The player can proceed with battle games more advantageously as the battle abilities of the ally characters become higher. Furthermore, the individual base values set for an ally character become higher as the stars (rarity) increase and as the character level becomes higher.

Furthermore, each ally character has set therefor four skills that are executed (invoked) in battle games. Each skill has a skill level set therefor, and the effect of the skill becomes higher as the skill level becomes higher. Note that, as a proceeding upper limit value, the character level is set to the skill level. Therefore, the skill level can be advanced within the character level serving as a limit.

Furthermore, each ally character can be equipped with (can have set therefor) equipment such as a weapon and armor. Each item of equipment has set therefor a character level that allows equipment, as well as values to be added to the offense ability, the defense ability, etc. When an ally character is equipped with equipment, the additional values of the individual items of equipment are added to the base values mentioned above, which makes it possible to enhance the battle abilities of the ally character.

Specifically, when one of the images of the ally characters displayed in the ally-character confirmation screen shown in FIG. 3B is tapped, an ally-character detail screen corresponding to the tapped ally character is displayed on the display 26, as shown in FIG. 3C. In the ally-character detail screen, an enhancement-item selection operating part 35, an enhancement-item display area 36, an enhancement-detail display area 37, and an auto-enhancement operating part 38 are provided.

In the enhancement-item selection operating part 35, a plurality of operating parts that can be operated (tapped) by the player are provided. In the enhancement-item selection operating part 35, an equipment selection operating part 35*a*, an Lv-enhancement selection operating part 35*b*, a skill-enhancement selection operating part 35*c*, and a star-enhancement selection operating part 35*d* are provided. In the enhancement-item selection operating part 35, one of these operating parts is selected, and the selected operating part is displayed in a highlighted manner.

In the enhancement-item display area 36, enhancement items corresponding to the selected operating part in the enhancement-item selection operating part 35 are displayed.

When the equipment selection operating part 35*a* in the enhancement-item selection operating part 35 is tapped, six items of equipment are displayed around the image of the ally character in the enhancement-item display area 36. Here, of the six items of equipment, the items of equipment that the ally character is not equipped with are displayed in gray, as indicated by hatching in the figure, and the items of equipment that the ally character is equipped with are displayed in color.

Furthermore, of the items of equipment that the ally character is not equipped with (the upper right item of equipment and the lower right item of equipment in the figure), in the case where there is any item of equipment that is already possessed (including the case where the item of equipment can be created), a mark indicated by "+" is displayed, as with the upper right item of equipment in the figure. Meanwhile, in the case where an item of equipment is not possessed (including the case where the equipment cannot be created), a label indicating "Available" is displayed, as with the lower right item of equipment in the figure. Note that "?" is indicated for an item of equipment that has not yet been implemented in the game, such as the upper left item of equipment in the figure.

Furthermore, each ally character has set therefor an equipment rank (RANK 15 in the figure) indicating the rank of the items of equipment that the ally character is equipped with. It becomes possible to advance the rank when the ally character has been equipped with all (six) items of equipment one rank lower. In the case where it is possible to advance the rank, a rank-advance operating part 39 becomes enabled. When the rank-advance operating part 39 is tapped, the equipment rank is advanced by one, and the items of equipment of the advanced equipment rank are displayed in the enhancement-item display area 36.

When one of the items of equipment in the enhancement-item display area 36 is tapped, the status of the operated item of equipment is displayed in the enhancement-detail display area 37. In the enhancement-detail display area 37, the following operating parts are displayed: an acquisition-method operating part 37a for displaying the method of acquiring the item of equipment; and an equipment operating part 37 for getting equipped with the item of equipment. Although not described in detail, when the acquisition-method operating part 37a is tapped, the method of acquiring the item of equipment is displayed on the display 26. Furthermore, when the equipment operating part 37b is tapped when the item of equipment is possessed, the ally character gets equipped with the item of equipment.

Then, when the ally character has been equipped with the item of equipment, in the enhancement-detail display area 37, an enhancement operating part 37c is displayed instead of the equipment operating part 37b, as shown in FIG. 4A. Here, it is possible to enhance the item of equipment up to five levels. Although not described in detail, when the enhancement operating part 37c is tapped, a screen for selecting an item for enhancing the item of equipment is displayed, and when an item is selected in the screen and a determination operating part, which is not shown, is tapped, the item of equipment is enhanced by consuming the selected item.

When the Lv-enhancement selection operating part 35b in the enhancement-item selection operating part 35 is tapped, in the enhancement-item display area 36, the character level as well as an experience value needed for advancing the character level by one are displayed around the image of the ally character, as shown in FIG. 4B.

Furthermore, in the enhancement-detail display area 37, a plurality of item display parts 37d for increasing the experience value are displayed. In each of the item display parts 37d, an item name, an item explanation, and a usage operating part 37e for using the item are displayed. When the usage operating part 37e is tapped, the experience value of the ally character is increased by the experience value corresponding to the item. Note that in the case where the player does not possess the item displayed in the item display part 37d, the usage operating part 37e for the item does not accept an operation by the player.

When the skill-enhancement selection operating part 35c in the enhancement-item selection operating part 35 is tapped, the image of the ally character is displayed in the enhancement-item display area 36, as shown in FIG. 4C. Furthermore, in the enhancement-detail display area 37, a plurality of skill display parts 37f are displayed. In each of the skill display parts 37f, a skill name, a skill level, and an enhancement operating part 37g for advancing the skill level are displayed. When the enhancement operating part 37g is tapped, an amount of the first currency corresponding to the skill level is consumed, whereby the skill level is advanced by one. Note that in the case where the player does not possess an amount of the first currency corresponding to the skill level and in the case where the skill level has reached the character level, the enhancement operating part 37g does not accept an operation by the player.

When the star-enhancement selection operating part 35d in the enhancement-item selection operating part 35 is tapped, in the enhancement-item display area 36, the image of the ally character as well as the stars (rarity) of the ally character are displayed, as shown in FIG. 5A. Furthermore, in the enhancement-detail display area 37, items for increasing (augmenting) the stars are displayed, and the number of items possessed by the player is displayed in relation to the number of items required to advance the stars (required number), for example, as 50/100.

Furthermore, in the enhancement-detail display area 37, the following operating parts are provided: an acquisition-method operating part 37a for displaying a method for acquiring the item; and a bloom operating part 37h for advancing the stars. In the case where the acquisition-method operating part 37a is operated, the method of acquiring the item is displayed on the display 26. Furthermore, when the number of items possessed by the player satisfies the required number and the bloom operating part 37h is tapped, the stars of the ally character are advanced by one. Note that in the case where the number of items for advancing the stars does not satisfy the required number, the bloom operating part 37h is displayed in gray, as indicated by hatching in FIG. 5A, and does not accept an operation by the player.

Note that in the case where the auto-enhancement operating part 38 is tapped in the ally-character detail screen, the player level, the skill level, and the equipment rank of the ally character are advanced as much as possible.

Figure 6B:
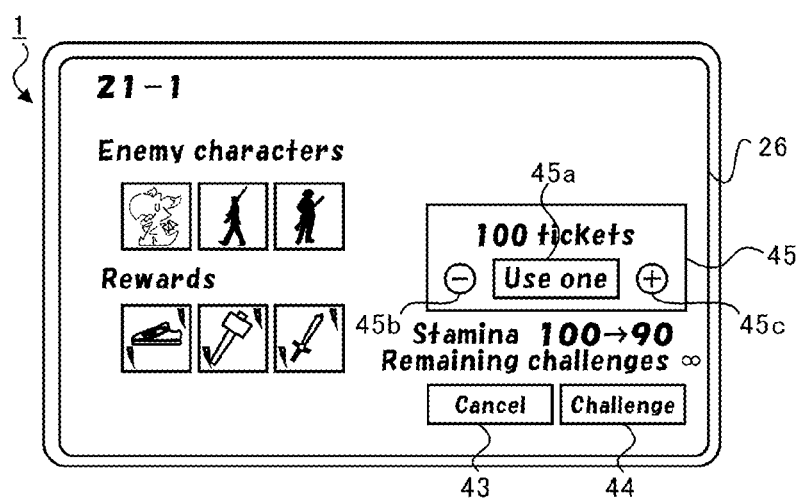
FIG. 6B is an illustration for explaining an example quest selection screen for a normal quest.
Figure 6C:
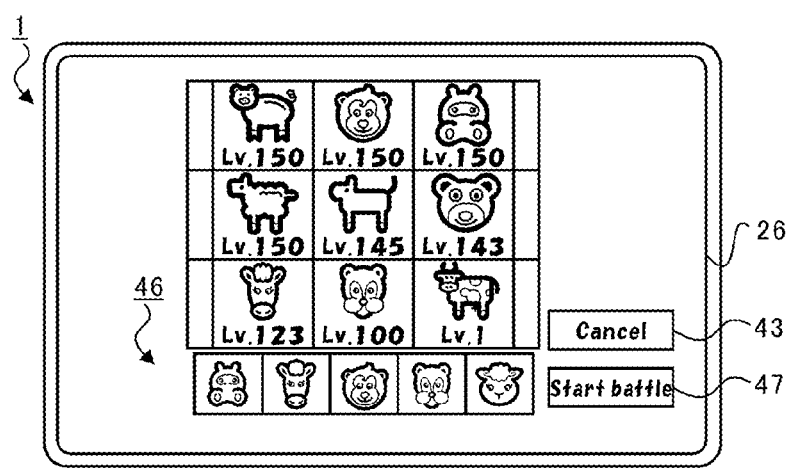
FIG. 6C is an illustration for explaining an example party selection screen.

FIG. 6A is an illustration for explaining an example quest screen for a normal quest. FIG. 6B is an illustration for explaining an example quest selection screen for a normal quest. FIG. 6C is an illustration for explaining an example party selection screen.

When the quest-screen selection operating part 30c is tapped in the home screen shown in FIG. 3A, the quest screen shown in FIG. 6A is displayed on the display 26. Although this embodiment will be described in the context of examples involving two types of battle games, namely, a normal quest and a hard quest, other types of battle games (a guild battle, etc.) may be provided.

Note that an opening condition is set depending on the type of battle game. Examples of the opening condition include a condition that the player level is greater than or equal to a prescribed value and a condition that the player has cleared other prescribed battle games. Furthermore, a plurality of battle games (layers) belong to each type of battle game. Opening conditions are also set individually for these battle games. Furthermore, when an opening condition is satisfied, game opening information included in the player information is updated.

In the quest screen, the following operating parts are provided: a normal-quest selection operating part 41a for selecting a normal quest; and a hard-quest selection operating part 41b for selecting a hard quest. The quest screen is configured so as to be always in a state where either the normal-quest selection operating part 41a or the hard-quest selection operating part 41b is selected, and the normal-quest selection operating part 41a is selected in the initial state. Although the following description will be directed to the case where the normal-quest selection operating part 41*a* is selected, the case where the hard-quest selection operating part 41*b* is selected can be similarly understood.

In the case where the normal-quest selection operating part 41*a* is selected, quest operating parts 42 for selecting one of the plurality of battle games (layers) belonging to normal quests are displayed in the quest screen.

In the quest operating parts 42, clearing information concerning the individual battle games is also displayed. For example, the clearing information is indicated by using three stars. In a battle game, when the battle game is cleared, stars are acquired in accordance with the number of ally characters whose life points have become zero at the time of clearing. For example, three stars are acquired in the case where there is no ally character whose life points have become zero, two stars are acquired in the case where there is one ally character whose life points have become zero, and one star is acquired in the case where there are two or more ally characters whose life points have become zero.

In the example in FIG. 6A, three stars are acquired in the battle game "21-1", two stars are acquired in the battle game "21-2", and two stars are acquired in the battle game "21-3". Furthermore, no star is acquired in the battle game "21-4", and it is reported that this battle game has not been cleared.

Note that for each quest (normal quest or hard quest), an opening condition that the immediately preceding battle game has to be cleared is set. For example, in the example in FIG. 6A, since the battle games up to and including "21-3" have been cleared, the battle game "21-4" is open, but the subsequent battle games ("21-5" and later, which are not shown) are not open.

In the quest screen, for example, when the quest operating part 42 for the battle game "21-1" is operated (tapped), the quest selection screen shown in FIG. 6B is displayed on the display 26. In the quest selection screen, enemy characters that appear in the battle game and an item (reward) that can be acquired in the battle game are displayed. Furthermore, in the quest selection screen, the stamina before and after the execution of the battle game as well as the number of remaining challenges are displayed. The number of remaining challenges indicate the number of challenges allowed in one day, and is set to infinity for normal-quest battle games. Furthermore, in this embodiment, the stamina that is consumed in a normal-quest battle game is set to 10. However, the stamina that is consumed in a normal-quest battle game may be varied among the individual battle games.

Furthermore, in the quest selection screen, a cancel operating part 43 and a challenge operating part 44 for challenging the battle game, labelled as "Challenge", are displayed.

When the cancel operating part 43 is operated (tapped), the quest screen shown in FIG. 6A is displayed on the display 26, and the challenge to the selected battle game "21-1" is cancelled.

Meanwhile, when the challenge operating part 44 is operated (tapped), the party selection screen shown in FIG. 6C is displayed on the display 26. In the party selection screen, all the ally characters possessed by the player are displayed, and a selected-ally-character display area 46 for displaying selected ally characters are displayed thereunder.

Furthermore, in the party selection screen, a cancel operating part 43 and a battle-start operating part 47 labelled as "Start battle" are displayed.

In the party selection screen, when the player operates (taps) a displayed ally character, the operated ally character is displayed in the selected-ally-character display area 46. That is, here, among the plurality of ally character IDs associated with the player IDs, ally character IDs for use (for party determination) in the battle game are selected.

Furthermore, when the ally characters (ally character IDs) are selected and the battle-start operating part 47 is operated (tapped), the battle game is started.

Figure 7A:
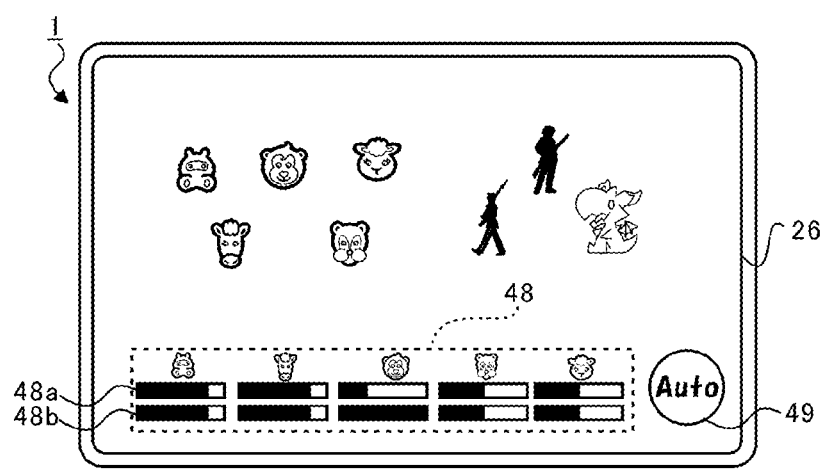
FIG. 7A is an illustration for explaining an example battle screen.
Figure 7B:
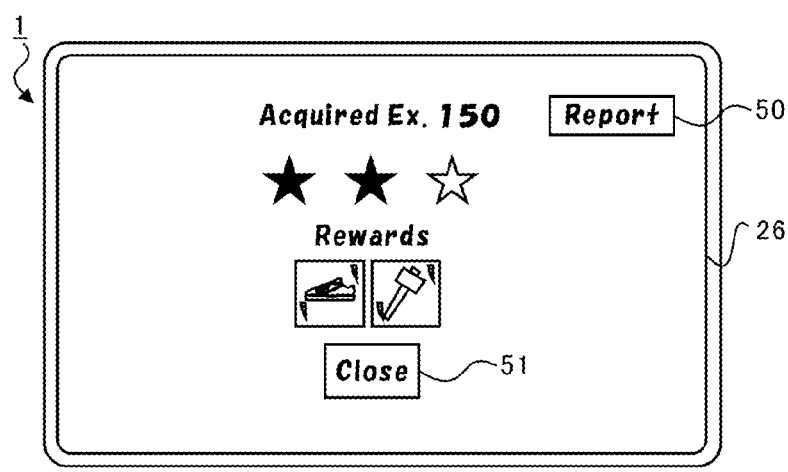
FIG. 7B is an illustration for explaining an example result screen.
Figure 7C:
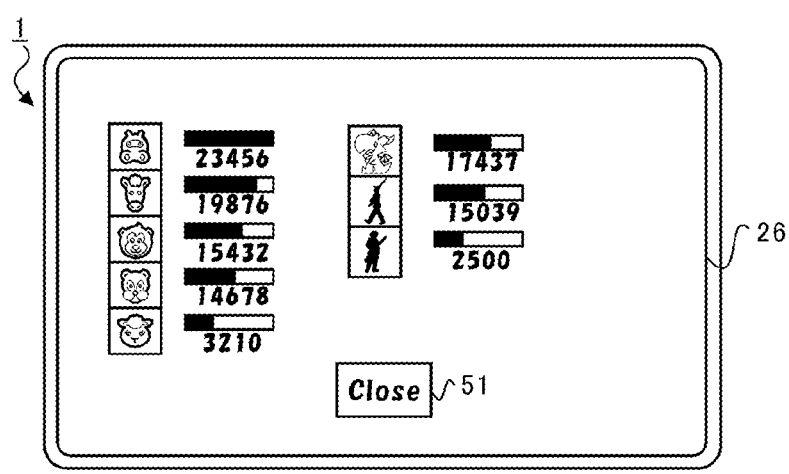
FIG. 7C is an illustration for explaining an example report screen.

FIG. 7A is an illustration for explaining an example battle screen. FIG. 7B is an illustration for explaining an example result screen. FIG. 7C is an illustration for explaining an example report screen. A battle game is started when the battle-start operating part 47 is operated (tapped) in the party selection screen shown in FIG. 6C.

During the battle game, a battle screen is displayed, as shown in FIG. 7A. In the battle screen, ally characters and enemy characters are displayed on the display 26. The ally characters take actions under computer control and give damage to the enemy characters and receive damage from the enemy characters. Furthermore, the enemy characters take actions under computer control, and give damage to the ally characters and receive damage from the ally characters.

When damage points are given to an enemy character, the damage points are subtracted from the life points of the enemy character. Similarly, when damage points are given to an ally character, the damage points are subtracted from the life points of the ally character. The player wins (clears) when the life points of all the enemy characters become zero, and the player is defeated when the life points of all the ally characters become zero.

Here, as shown in FIG. 7A, an ally-character display area 48 is provided in a lower part of the battle screen. In the ally-character display area 48, life points 48*a* and a skill gauge 48*b* for each of the ally characters are displayed. The skill gauge 48*b* is increased when the ally character receives damage from an enemy character or give damage to an enemy character. Furthermore, when the skill gauge 48*b* reaches a predetermined maximum value, it becomes possible for the ally character to use the skill. The skill may give greater damage points to an enemy character compared with a normal attack, may recover the life points of the ally character, or may exert a special effect on an enemy character.

Here, two patterns are provided as methods for using a skill. In one method, the player operates (taps) an ally character whose skill gauge 48*b* displayed in the ally-character display area 48 has reached the maximum value. In the other method, when the skill gauge 48*b* reaches the maximum value in an auto state, the ally character uses the skill under computer control. Note that an auto-selection operating part 49 is displayed in the battle screen, which makes it possible to perform switching between an auto state and a manual state in accordance with operations of the auto-selection operating part 49. When the auto-selection operating part 49 is operated in the manual state, the player enters the auto state, in which the skill is used automatically. Meanwhile, when the auto-selection operating part 49 is operated in the auto state, the player enters the manual state, in which the skill is used manually. Note that even in the auto state, it is possible to use the skill when the player operates (taps) an ally character in a state where the skill gauge 48*b* has reached the maximum value and the skill has not been used under computer control.

Furthermore, when the battle game is finished normally (normal finish), a result screen is displayed on the display 26, as shown in FIG. 7B. FIG. 7B shows, as an example, a result screen after the battle game is cleared.

In the result screen, the following operating parts are displayed: a report display operating part 50 labelled as "Report", in which at least a portion of game result information of the battle game is displayed; and a close operating part 51 labelled as "Close".

The game result information includes: the ally-character IDs of the ally characters (party); the enemy character IDs of the enemy characters; the status of survival of the ally characters and the enemy characters at the end of the battle (whether or not the life points thereof have become zero at the end of the battle game); the given damage points (total values); the distinction as to the manual state or the auto state; a battle log ID; the type of the battle game (normal quest, hard quest, or the like); information (clearing information, the layer of the battle game, etc.) associated with each type of battle game; assigned item information; an assigned amount of the first currency, etc. Furthermore, the battle log ID is assigned uniquely to each battle game. Furthermore, the content of the information associated with each type of battle game varies among the individual types of battle games. Furthermore, in the case where a battle game has been cleared, at the server 100, for each item preset in the cleared battle game, it is determined through a lottery whether or not to assign the item to the player. Then, items that are assigned to the player are assigned to the game result information, which is displayed on the result screen.

When the close operating part 51 is operated (tapped) in the result screen, what is displayed on the display 26 is switched from the battle screen to a normal screen. That is, the result screen is a part of the battle screen. The normal screen that is displayed after the switching from the result screen may be the screen that had been displayed immediately before the switching to the battle screen, or a prescribed screen, such as the home screen. When the displayed result screen is closed, as described above, the battle game is finished.

When the report display operating part 50 is operated (tapped) in the result screen, the report screen shown in FIG. 7C is displayed on the display 26. In the report screen, the damage points (total values) given by the ally characters and the enemy characters are displayed, and a close operating part 51 is displayed.

When the close operating part 51 is operated (tapped), the result screen shown in FIG. 7B is displayed on the display 26.

Furthermore, in the quest selection screen shown in FIG. 6B, a ticket display area 45 is provided. In the ticket display area 45, the number of tickets possessed by the player (the number of tickets associated with the player ID) is displayed, and a ticket-using challenge operating part 45a, a minus operating part 45b, and a plus operating part 45c are provided. The ticket-using challenge operating part 45a, the minus operating part 45b, and the plus operating part 45c are enabled only in battle games for which three stars have been acquired as clearing information, and are disabled in battle games for which three stars have not been acquired as clearing information.

In the case where the ticket-using challenge operating part 45a, the minus operating part 45b, and the plus operating part 45c are enabled, each time the plus operating part 45c is operated (tapped), the text indicated in the ticket-using challenge operating part 45a is displayed such that the number of tickets is increased by one, such as "Use two" and "Use three". Meanwhile, each time the minus operating part 45b is operated (tapped), the text indicated in the ticket-using challenge operating part 45a is displayed such that the number of tickets is decreased by one, such as "Use two" and "Use one".

Furthermore, for example, when the ticket-using challenge operating part 45a is operated (tapped) in the case where the text indicated in the ticket-using challenge operating part 45a reads "Use five", the party formation in the party selection screen shown in FIG. 6C and the battle-game execution in the battle screen shown in FIG. 7A are skipped by consuming five tickets and a stamina of 50. Then, it is considered that all the (five) battle games have been cleared, and a result screen like the one shown in FIG. 7B is displayed. In the result screen, items acquired in the five battle games are displayed collectively.

As described above, by consuming tickets, battle games for which three stars have been acquired as clearing information are skipped, and it is considered that the battle games have been cleared. This makes it possible for the player to collect items in a shorter time.

Figure 8B:
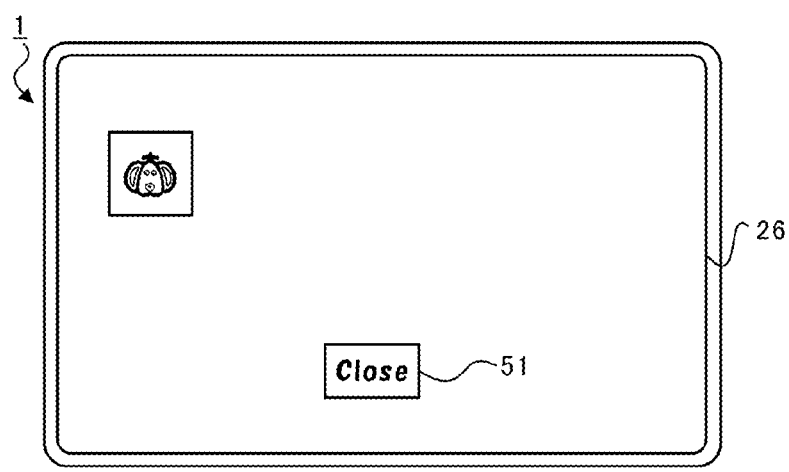
FIG. 8B is an illustration for explaining an example gacha result screen.

FIG. 8A is an illustration for explaining an example gacha screen. FIG. 8B is an illustration for explaining an example gacha result screen.

When the gacha-screen selection operating part 30d is tapped in the home screen shown in FIG. 3A, the gacha screen shown in FIG. 8A is displayed on the display 26. A gacha-type selection bar 52 is displayed in an upper part of the gacha screen. In the gacha-type selection bar 52, gacha-type operating parts indicating the types of gacha currently being held (conducted) are displayed.

In this embodiment, the following gacha types are provided: "normal", with which it is possible to acquire items; as well as "pickup" and "raising gacha", with which it is possible to acquire ally characters. With "normal", it is possible to acquire items for free twice a day.

With the gacha types with which it is possible to acquire ally characters, it is possible to have a lottery performed by consuming a prescribed amount of the second currency. Furthermore, among the individual gacha types, at least either of the ally characters that are subject to lottery and the lottery probabilities (winning probabilities) of the individual ally characters mutually vary. Furthermore, some gacha types have set therefor periods in which it is possible to perform lotteries.

Furthermore, "pickup" and "raising gacha" individually have set in advance therefor periods in which it is possible to perform lotteries. With "pickup", by using one of prescribed ally characters as a subject character, the winning probability of the subject character is set to be higher than that of the other ally characters. Furthermore, with "pickup", for example, the subject character is changed every two weeks. Therefore, it can be said that the gacha types of "Pickup" with different subject characters or holding periods mutually vary.

With "raising gacha", as will be described later in detail, a prescribed ally character is considered as a subject character, and when the subject character is won, it becomes possible to acquire the subject character in a state where the status of the subject character is higher than initial values. Furthermore, with "raising gacha", for example, the subject character is changed every two weeks. Note that in the case where an ally character other than the subject character is determined in "raising gacha" and in the case where an ally character is determined in "pickup", the ally character is assigned to the player in the status based on initial values (e.g., the character level is 1, and the equipment rank is 1).

The server 100 stores, for each gacha type, a lottery table in which the lottery probabilities of ally characters are set, as well as holding period information (information indicating a period during which it is possible to refer to the lottery table), and a lottery (gacha) is performed by referring to the lottery table for a selected gacha type.

In the gacha-type selection bar 52, the gacha-type operating parts corresponding to the types of gacha currently being held are displayed. For example, in the example in FIG. 8A, the following operating parts are displayed: a normal-gacha operating part 52a corresponding to "normal"; a raising-gacha operating part 52b corresponding to "raising gacha", and a pickup-gacha operating part 52c corresponding to "pickup".

In the gacha-type selection bar 52, the gacha-type operating part corresponding to a selected gacha type is displayed in a highlighted manner so that the selected gacha type can be distinguished.

For example, as shown in FIG. 8A, in the case where the pickup-gacha operating part 52c is selected, an image corresponding to "pickup" is displayed at the center of the display 26. Specifically, an image labelled as "Pickup gacha" is displayed, or the image of an ally character (e.g., character A) serving as a subject character in "pickup" is displayed. Furthermore, in the gacha screen, the amount of the second currency possessed by the player is displayed.

Furthermore, in the gacha screen, lottery operating parts for executing lotteries are displayed. Specifically, the following operating parts are displayed: a first lottery operating part 53a for performing a lottery by consuming 50 of the second currency, which is limited to once a day; a second lottery operating part 53b for performing a lottery by consuming 150 of the second currency; and a third lottery operating part 53c for performing ten lotteries collectively (performing what is called a series of ten gacha) by consuming 1500 of the second currency.

Furthermore, for example, when the first lottery operating part 53a is tapped, at the server 100, a lottery is performed with reference to the lottery table corresponding to "pickup" currently being held, an ally character (ally character ID) determined by the lottery is stored in association with the player ID, and lottery result information indicating the determined ally character is transmitted to the player terminal 1. At the player terminal 1, upon receiving the lottery result information, the gacha result screen shown in FIG. 8B is displayed on the display 26. In the gacha result screen, the image of the ally character indicated by the lottery result information is displayed.

Furthermore, when the third lottery operating part 53c is tapped, at the server 100, ten lotteries are performed with reference to the lottery table corresponding to "pickup" currently being held, ally characters (ally character IDs) determined by the lotteries are stored in association with the player ID, and lottery result information indicating the determined ally characters is transmitted to the player terminal 1. At the player terminal 1, upon receiving the lottery result information, the gacha result screen is displayed on the display 26, and ten images of the ally characters indicated by the lottery result information are displayed. Note that in the case where the player already possesses an ally character determined by the lottery, a prescribed item may be assigned to the player instead of the ally character.

Meanwhile, in this embodiment, when a prescribed condition is satisfied, it becomes possible to change parameters of ally characters (game objects) to specified values for free. For example, the prescribed condition refers to the case where a raising jade (game item) has been used as an item or the case where a subject character has been determined through a lottery as a result of "raising gacha".

Specifically, in the game in this embodiment, raising jades are provided as items. For example, raising jades are distributed from the administrator, or the player can acquire raising jades when the player has cleared prescribed battle games or has cleared prescribed events.

The raising jades make it possible to increase (change) for free, for example, the character level, the skill level, and the equipment rank among the parameters of ally characters. As will be described later in detail, each raising jade has a free enhancement ID set therefor in advance, allowing free increases up to the character level, the skill level, and the equipment rank based on the set free enhancement ID.

Figure 9A:
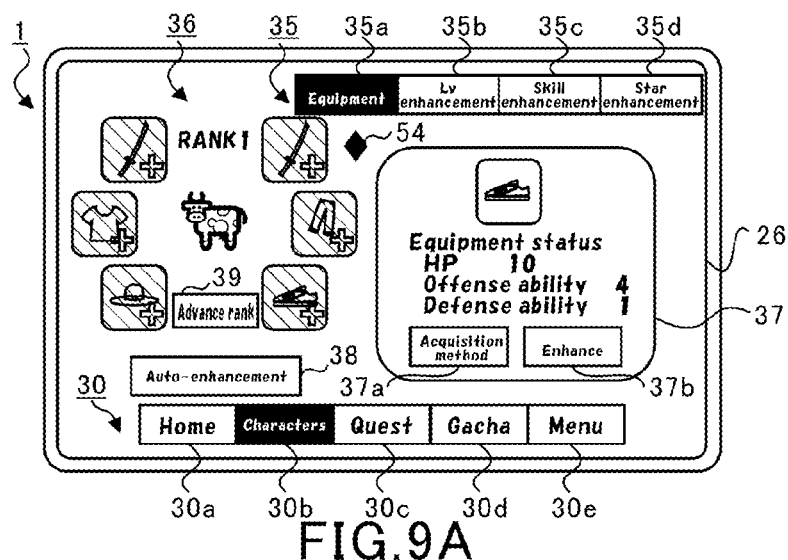
FIG. 9A is an illustration for explaining an example ally-character detail screen for the case where raising jades are possessed.
Figure 9B:
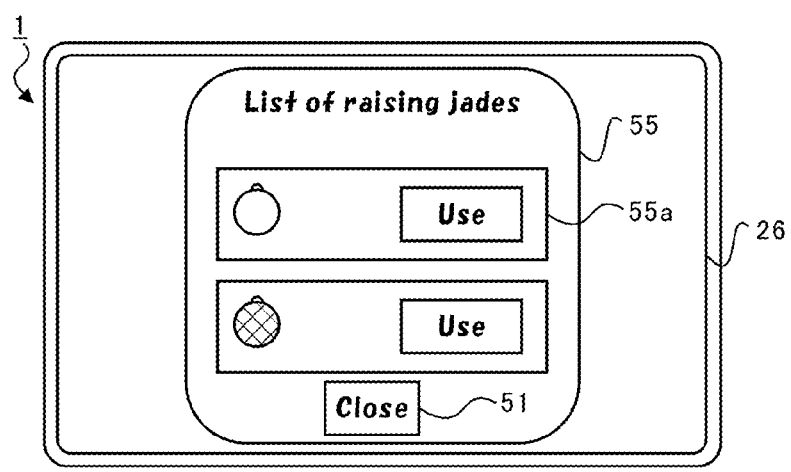
FIG. 9B is an illustration for explaining an example raising-jade-list popup.
Figure 9C:
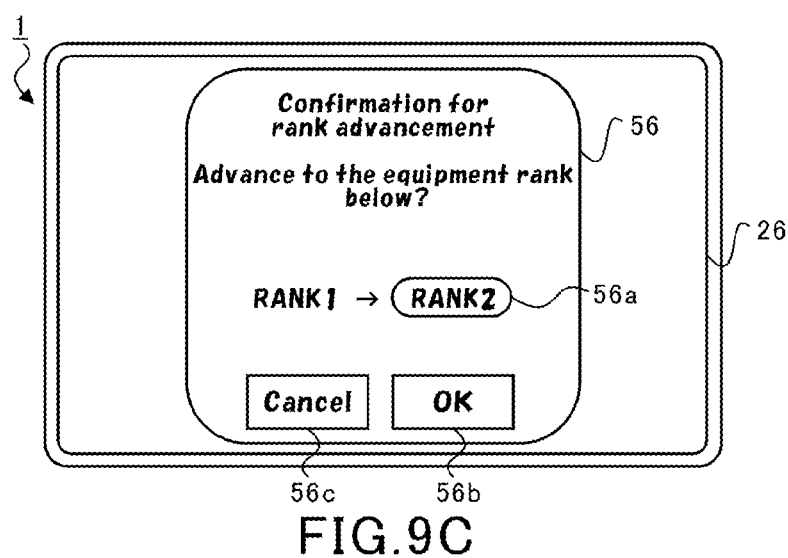
FIG. 9C is an illustration for explaining an example equipment-rank enhancement popup.
Figure 10A:
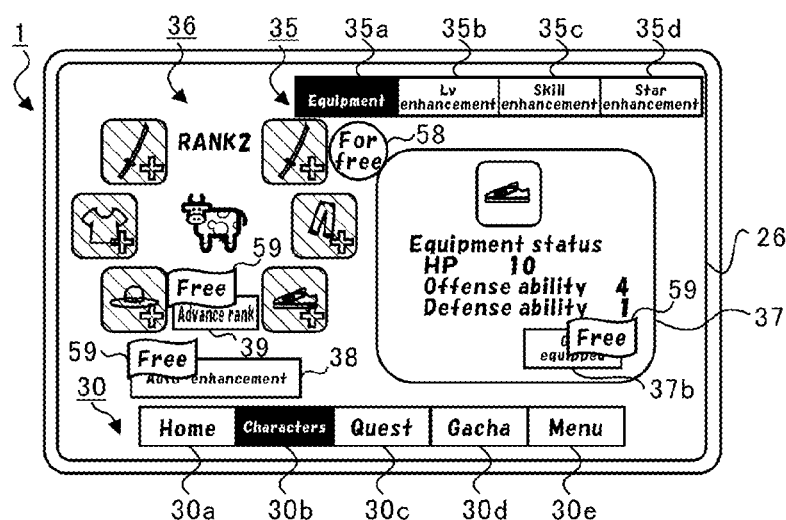
FIG. 10A is a first illustration for explaining an example ally-character detail screen for the case after raising jades are possessed.
Figure 10B:
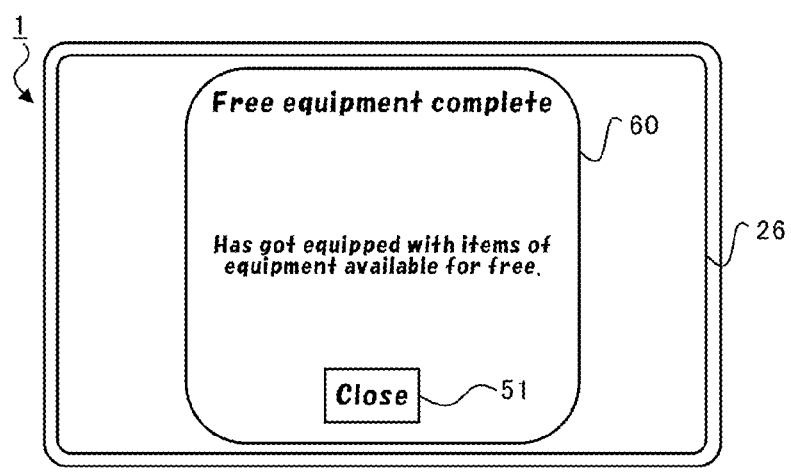
FIG. 10B is an illustration for explaining an example free-equipment completion popup.

FIG. 9A is an illustration for explaining an example ally-character detail screen for the case where raising jades are possessed. FIG. 9B is an illustration for explaining an example raising-jade-list popup 55. FIG. 9C is an illustration for explaining an example equipment-rank enhancement popup 56. FIG. 10A is a first illustration for explaining an example ally-character detail screen for the case after raising jades are possessed. FIG. 10B is an illustration for explaining an example free-equipment completion popup 60.

In the case where the player possesses raising jades and the prescribed usage condition is satisfied, a raising-jade icon 54 that functions as an operating part is displayed at the center of the ally-character detail screen, as shown in FIG. 9A. Examples of the usage condition include the following conditions: "2-5" in a normal quest has been cleared and other raising jades have not been used for the ally character; the ally character is not a subject character in "raising gacha"; and it is possible to increase at least one parameter if the raising jade is used.

When the raising-jade icon 54 is tapped, the raising-jade-list popup 55 shown in FIG. 9B is displayed on the display 26. In the raising-jade-list popup 55, images of the raising jades possessed by the player as well as usage operating parts 55a for using the individual raising jades are displayed. When the image of a raising jade is held down, the character level and the equipment rank within which free increases are allowed with raising jade are displayed on the display 26. Furthermore, a close operating part 51 is displayed in the raising-jade-list popup 55, and the raising-jade-list popup 55 is no longer displayed when the close operating part 51 is tapped.

When the usage operating part 55a corresponding to an available raising jade is operated, the equipment-rank enhancement popup 56 shown in FIG. 9C is displayed on the display 26. The following description will be given in the context of an example where the character level of the ally character is 1, the equipment rank thereof is 1, and the equipment rank can be advanced to 10 and the character level can be advanced to 100 for free in the case where the raising jade is used.

In the equipment-rank enhancement popup 56, a pull-down equipment-rank selection operating part 56a for selecting an equipment rank is provided. The player selects a desired equipment rank by operating the equipment-rank selection operating part 56a. In the equipment-rank selection operating part 56a, on the basis of the player level and the equipment rank up to which advancing is possible with the raising jade used, equipment ranks up to the equipment rank within which advancing is currently possible are displayed as candidates in a pull-down manner.

Furthermore, in the equipment-rank enhancement popup 56, a determination operating part 56b and a cancel operating part 56c are displayed. When the cancel operating part 56c is tapped, the usage of the raising jade is cancelled, and the equipment-rank enhancement popup 56 is no longer displayed.

Meanwhile, when the determination operating part 56*b* is tapped, the raising jade is used, and the equipment rank of the ally character is advanced, for example, to "RANK 2" (it is considered that the ally character has been equipped with all the items of equipment for "RANK 1"), and the character level is advanced to 3, which is required for getting equipped with the items of equipment for "RANK 1".

Then, as shown in FIG. 10A, it is displayed in the ally-character detail screen that the equipment rank has become RANK 2, and a free-subject indication image 58 labelled as "for free" is displayed, indicating that the character level or the equipment rank can be further advanced for free with a raising jade.

Furthermore, in the enhancement-detail display area 37, the acquisition-method operating part 37*a* becomes hidden, and a free banner 59 labelled as "free", indicating that a free increase is allowed, is displayed so as to be superimposed on the equipment operating part 37*b*.

Furthermore, free banners 59 are also displayed so as to be superimposed on the auto-enhancement operating part 38 and the rank-advance operating part 39. Furthermore, when the equipment operating part 37*b* having the free banner 59 superimposed thereon is tapped, the ally character, for free, gets equipped with the item of equipment displayed in the enhancement-detail display area 37 (without having to consume any item of equipment possessed by the player). Furthermore, when the rank-advance operating part 39 having the free banner 59 superimposed thereon is tapped, the equipment rank is advanced by one for free. Furthermore, when the auto-enhancement operating part 38 having the free banner 59 superimposed thereon is tapped, the player level, the skill level, and the equipment rank of the ally character are advanced for free as much as possible.

Furthermore, when the equipment rank reaches RANK 10 and the ally character becomes equipped with all the items of equipment for RANK 10 for free, a free-equipment completion popup 60 is displayed on the display 26, as shown in FIG. 10B. In the free-equipment completion popup 60, text reporting to the player that the ally character has been equipped with all the items of equipment available for free is displayed.

Figure 11A:
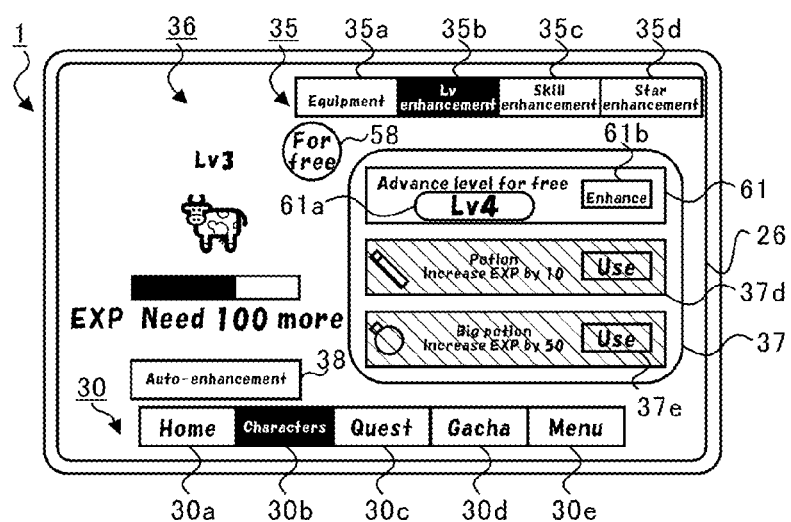
FIG. 11A is a second illustration for explaining an example ally-character detail screen for the case after raising jades are possessed.
Figure 11B:
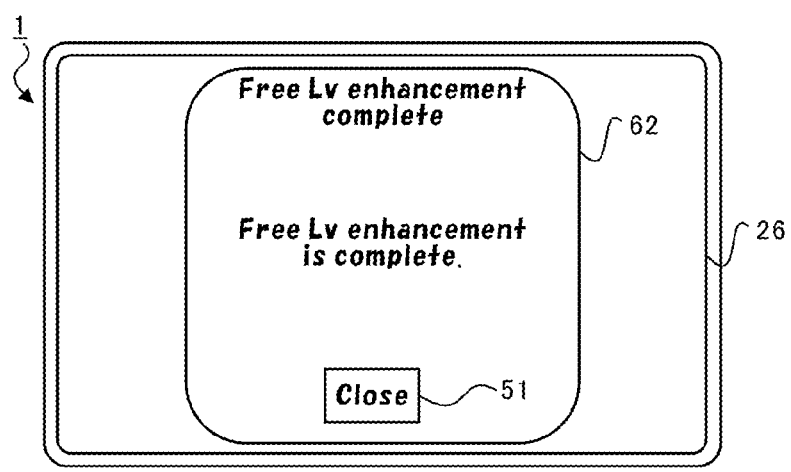
FIG. 11B is an illustration for explaining an example free-Lv-enhancement completion popup.

FIG. 11A is a second illustration for explaining an example ally-character detail screen for the case after raising jades are possessed. FIG. 11B is an illustration for explaining an example free-Lv-enhancement completion popup 62.

When the Lv-enhancement selection operating part 35*b* is tapped in the ally-character detail screen shown in FIG. 10A, the ally-character detail screen shown in FIG. 11A is displayed on the display 26. In the ally-character detail screen shown in FIG. 11A, a free-subject indication image 58 is displayed.

Furthermore, in the enhancement-detail display area 37, a free-level-advance indication part 61 is displayed above the item display parts 37*d*. In the free-level-advance indication part 61, a pull-down level selection operating part 61*a* for selecting a level up to which the character level is to be advanced is provided. The player selects a desired character level by operating the level selection operating part 61*a*. In the level selection operating part 61*a*, on the basis of the player level as well as the character level up to which advancing is possible with the raising jade used, character levels up to the character level within which advancing is currently possible are displayed as candidates in a pull-down manner.

Furthermore, when the enhancement operating part 61*b* is tapped, the character level is advanced to the character level displayed in the level selection operating part 61*a*. Then, when the character level becomes 100, a free-Lv-enhancement completion popup 62 is displayed on the display 26, as shown in FIG. 11B. In the free-Lv-enhancement completion popup 62, text indicating that the character level has been advanced to the character level up to which free advancing is possible is displayed. Note that the usage operating parts 37*e* of the item display parts 37*d* do not accept operations by the player, as indicated by hatching in the figure, until the character level of the ally character becomes advanced to the character level up to which free advancing is possible.

The skill level can be advanced for free up to the same level as the character level by using a raising jade; however, since the method of advancing the skill level is the same as that of the character level, a description thereof will be omitted.

As described above, with the information processing system S, in the case where a raising jade has been used, up to the character level (skill level) and the equipment rank indicated by a free enhancement ID associated with the raising jade, it is possible to increase these parameters for free. That is, with the information processing system S, upon the satisfaction of a prescribed condition that a raising jade has been used, it becomes possible to change, for free, parameters of ally characters (game objects) to specified values (a character level (skill level) and an equipment rank indicated by a free enhancement ID associated with the raising jade).

Therefore, for example, even in the case where the raising jade is used when the player level is lower than the character level indicated by the free enhancement ID associated with the raising jade, it is possible to advance, for free (on terms more advantageous than usual), the character level of an ally character up to the character level indicated by the free enhancement ID. Accordingly, the information processing system S can alleviate the sense of loss experienced by the player.

Next, the case where a subject character has been determined through a lottery as a result of "raising gacha" will be described.

Figure 12:
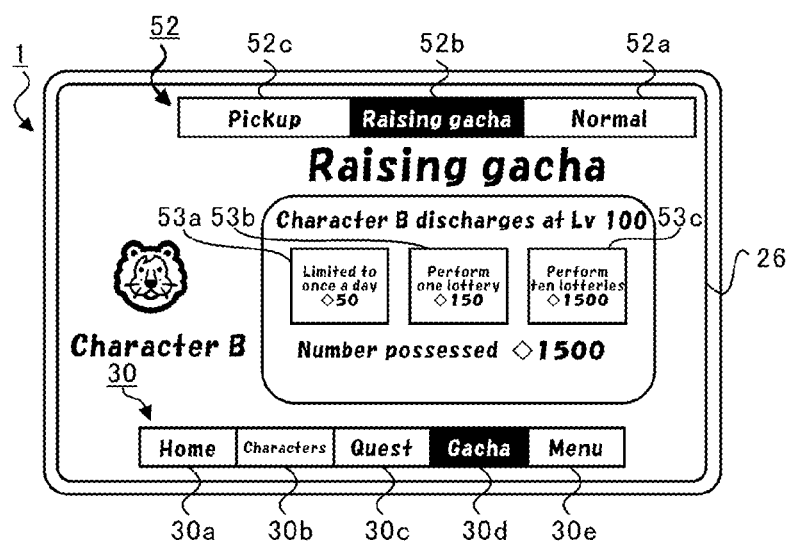
FIG. 12 is an illustration for explaining an example gacha screen for "raising gacha".

FIG. 12 is an illustration for explaining an example gacha screen for "raising gacha". As shown in FIG. 12A, when the raising-gacha operating part 52*b* is tapped in the gacha screen, an image corresponding to "raising gacha" is displayed at the center of the display 26. Specifically, an image labelled as "raising gacha" is displayed, or an image of an ally character (e.g., character B) serving as a subject character in "raising gacha" is displayed. Furthermore, in the gacha screen, the amount of the second currency possessed by the player is displayed.

Furthermore, in the gacha screen, the character level up to which free advancing is allowed for the subject character is displayed, and a first lottery operating part 53*a*, a second lottery operating part 53*b*, and a third lottery operating part 53*c* for executing lotteries are displayed.

Note that the parameters that can be advanced for free when a subject character has been determined are one or more of the character level, the equipment level, the stars (rarity), and the skill level. In "raising gacha", the values (specified values) of parameters up to which free advancing is allowed when a subject character has been determined are set in advance by using free enhancement IDs, which will be described later.

Furthermore, for example, when the first lottery operating part 53*a* is tapped, at the server 100, a lottery is performed with reference to the lottery table corresponding to "raising gacha" currently being held. Suppose further that a subject character has been determined through the lottery. At this time, in the case where the player does not possess the subject character and the player level is higher than the character level up to which a free increase is allowed, the subject character is assigned to the player in a state where all the parameters have been increased to the values up to which free increases are allowed.

Meanwhile, in the case where the player does not possess the subject character and the player level is lower than the character level up to which a free increase is allowed, the subject character is assigned to the player in a state where the parameters have been increased to values corresponding to the player level (e.g., to the player level in the case of the character level), and a privilege with which the parameters can be subsequently increased for free up to the values within which increases are allowed is assigned.

Meanwhile, in the case where the player possesses the subject character and all the parameters of the subject character possessed by the player are greater than the parameter values within which free increases are allowed, a prescribed item is assigned to the player.

Meanwhile, in the case where the player possesses the subject character and at least one of the parameters of the subject character possessed by the player is lower than the parameter value within which a free increase is allowed, a prescribed item is assigned to the player, and a privilege that makes it possible to subsequently increase the parameter for free up to a value within which a free increase is allowed is assigned.

Note that in the case where a subject character has been determined in "raising gacha" and a privilege that makes it possible to increase parameters up to values within which free increases are allowed has been assigned, it is possible to increase the parameters for free by performing operations on the ally-character detail screen, similarly to the case where a raising jade has been used.

As described above, with the information processing system S, in the case where a subject character has been determined in "raising gacha", up to the character level (skill level), the equipment rank, etc. indicated by a free enhancement ID associated with the subject character, it is possible to increase these parameters for free. That is, with the information processing system S, upon the satisfaction of a prescribed condition that a subject character has been determined in "raising gacha", it becomes possible to change, for free, parameters of ally characters (game objects) to specified values (a character level (skill level), an equipment rank, etc. indicated by a free enhancement ID associated with the subject character).

Therefore, for example, even in the case where a subject character is acquired in "raising gacha" when the player level is lower than the character level indicated by the free enhancement ID associated with the subject character (even in the case where the character level indicated by the free enhancement ID exceeds the player level), it is possible to advance, for free (on terms more advantageous than usual), the character level of an ally character up to the character level indicated by the free enhancement ID. Accordingly, the information processing system S can alleviate the sense of loss that is experienced by the player.

FIG. 13A is a diagram for explaining a free enhancement ID database. The free enhancement ID database shown in FIG. 13A is stored in the player terminal 1 and the server 100. In the free enhancement ID database, parameter values within which free increases are allowed (specified values) are set for each free enhancement ID.

For example, in the case where the free enhancement ID is 1, it is possible to advance, for free, the character level (skill level) up to 100 and the equipment rank up to 10.

The free enhancement ID database is used commonly with raising jades and in "raising gacha". A raising jade is assigned to the player in a state where one of the free enhancement IDs is associated therewith. Furthermore, in "raising gacha", one of the free enhancement IDs is associated with the subject character. In the case where a subject character is determined through a lottery in "raising gacha", the subject character having the associated free enhancement ID attached thereto is assigned to the player.

FIG. 13B is a diagram for explaining an ally-character database. The ally-character data shown in FIG. 13B is stored in the player terminal 1 and the server 100. In the ally-character database, information (parameters and free enhancement IDs) concerning the ally characters possessed by the player is stored in association with the player ID.

Specifically, for each of the ally character IDs of the ally characters possessed by the player, the values of various kinds of parameters, as well as a free enhancement ID in the case where a free enhancement ID is associated with the ally character, are stored.

Here, in the ally character database, for each ally character ID, it is possible to separately store a free enhancement ID that is associated as a result of usage of a raising jade (free enhancement Ida in the figure) and a free enhancement ID that is associated as a result of determination of a subject character through "raising gacha" (free enhancement IDb in the figure).

That is, with an ally character, for example, in the case where a free enhancement ID is associated as a result of determination of a subject character through "raising gacha" after a free enhancement ID is associated as a result of usage of a raising jade, the same parameters (e.g., the character level) are specified for both free enhancement IDs. In this case, priority is given to the one with higher parameter values, and it is possible to increase the parameter values for free up to the values having priority.

Note that when all the parameters associated with a free enhancement ID have been increased for free, the free enhancement ID is deleted from the ally character database.

Next, the basic configurations of and communication processes at the player terminal 1 and the server 100 will be described. Here, the description will be directed to an example of basic communication processes for proceeding with the game, as well as main communication processes concerning free parameter increases, while omitting descriptions of other processes.

(Functional Configuration of Player Terminal 1)

Figure 14:
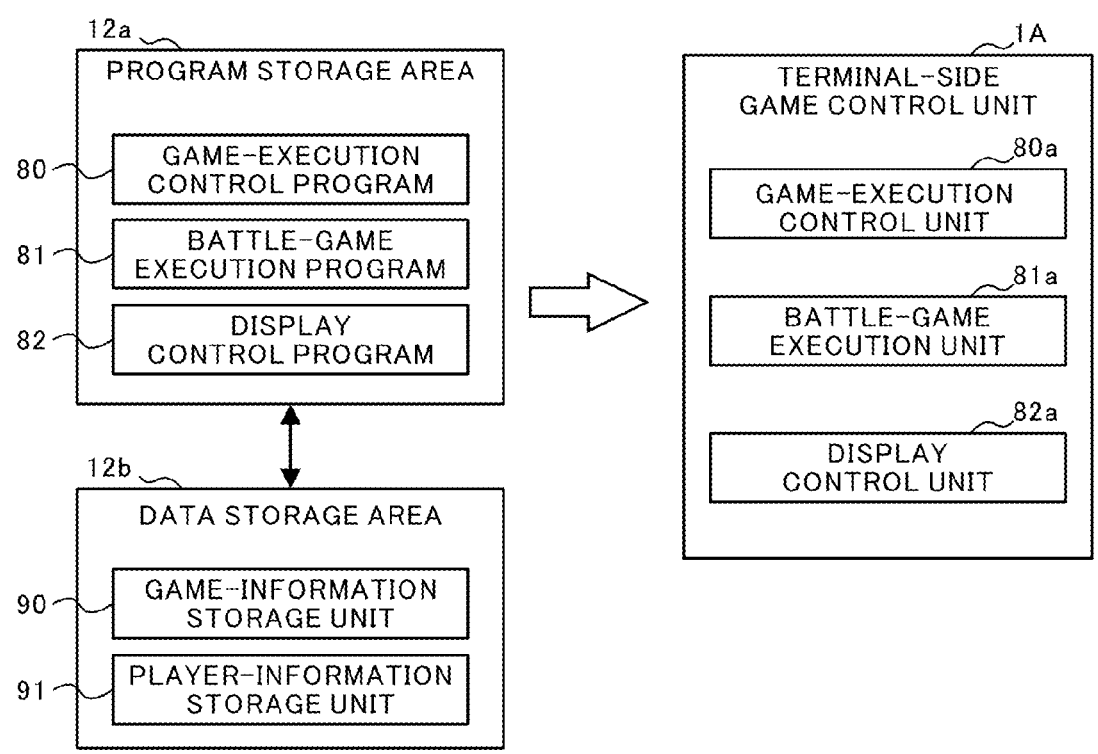
FIG. 14 is a diagram for explaining the configuration of a memory at the player terminal as well as functions thereof as a computer.

FIG. 14 is a diagram for explaining the configuration of the memory 12 at the player terminal 1, as well as the functions thereof as a computer. In the memory 12, a program storage area 12a and a data storage area 12b are provided. Upon the start of the game, the CPU 10 stores terminal-side game control programs (modules) in the program storage area 12a.

The terminal-side game control programs include a game-execution control program 80, a battle-game execution program 81, and a display control program 82. Note that the programs listed in FIG. 14 are examples, and the terminal-side game control programs include a large number of other programs.

In the data storage area 12b, a game-information storage unit 90 and a player-information storage unit 91 are provided as storage units for storing data. Note that the storage units mentioned above are examples, and a large number of other storage units are provided in the data storage area 12b.

The CPU 10 runs the individual programs stored in the program storage area 12a to update the data in the individual storage units in the data storage area 12b. Then, by running the individual programs stored in the program storage area 12a, the CPU 10 causes the player terminal 1 (computer) to function as a terminal-side game control unit 1A. The terminal-side game control unit 1A includes a game-execution control unit 80a, a battle-game execution unit 81a, and a display control unit 82a.

Specifically, the CPU 10 runs the game-execution control program 80, thereby causing the computer to function as the game-execution control unit 80a. Similarly, the CPU 10 runs the battle-game execution program 81 and the display control program 82, thereby causing the computer to function as the battle-game execution unit 81a and the display control unit 82a, respectively.

The game-execution control unit 80a controls the proceeding of the game as a whole. The game-execution control unit 80a transmits log-in information to the server 100, for example, at the time of log-in. Furthermore, the game-execution control unit 80a executes control concerning transitions among normal screens. Furthermore, in the case where game information concerning the game in general has been updated, the game-execution control unit 80a receives the game information from the server 100 and saves the game information in the game-information storage unit 90.

The battle-game execution unit 81a is in charge of control for executing battle games. For example, on the basis of operations input to the player terminal 1, the battle-game execution unit 81a updates battle screens, controls actions of ally characters and enemy characters, and derives damage points.

The display control unit 82a generates screens to be displayed on the display 26 and causes the display 26 to display the generated screens.

(Functional Configuration of Server 100)

Figure 15:
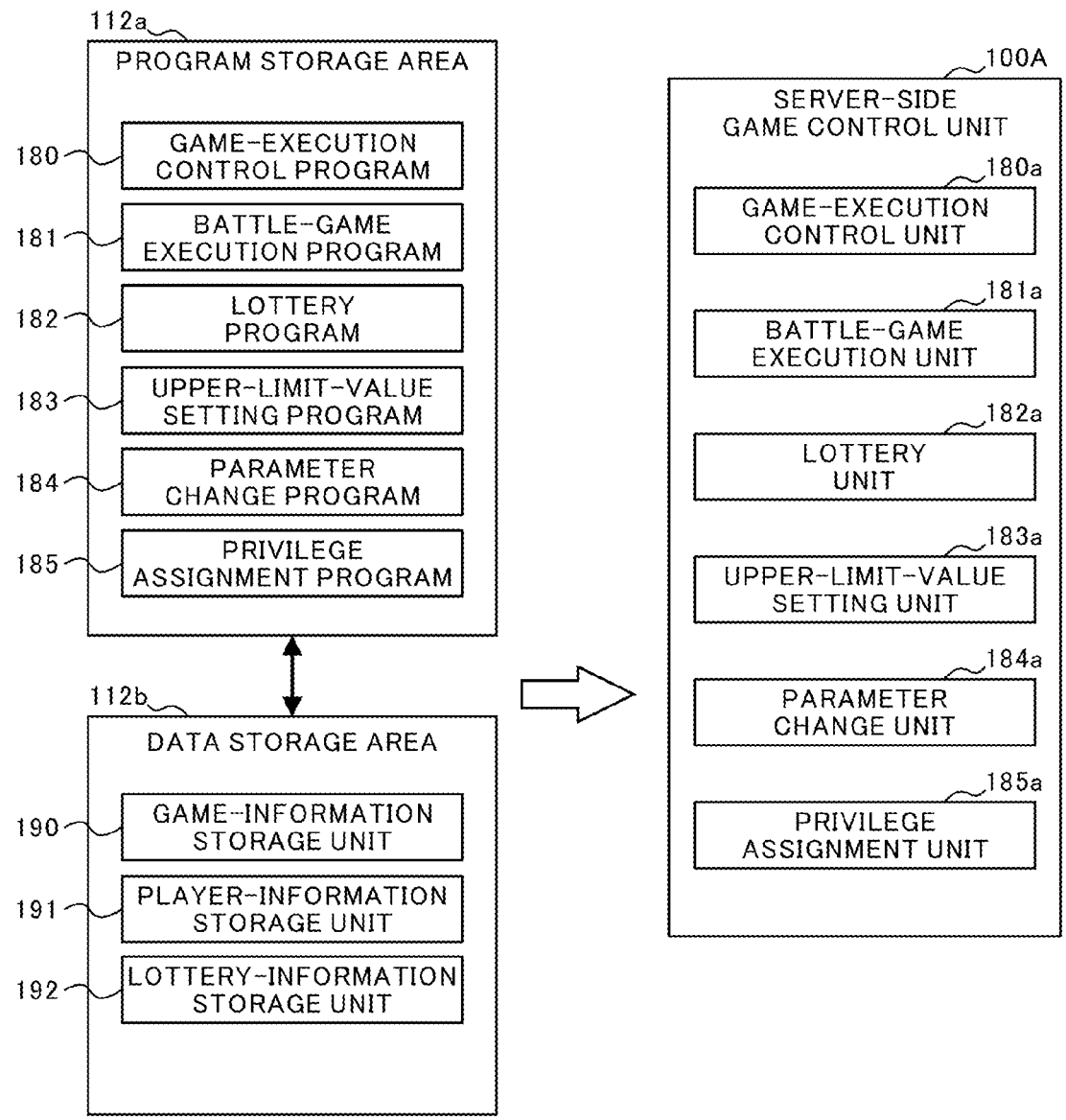
FIG. 15 is a diagram for explaining the configuration of a memory at the server as well as the functions thereof as a computer.

FIG. 15 is a diagram for explaining the configuration of the memory 112 at the server 100, as well as the functions thereof as a computer. In the memory 112, a program storage area 112a and a data storage area 112b are provided. Upon the start of the game, the CPU 110 stores server-side game control programs (modules) in the program storage area 112a.

The server-side game control programs include a game-execution control program 180, a battle-game execution program 181, a lottery program 182, an upper-limit-value setting program 183, a parameter change program 184, and a privilege assignment program 185. Note that the programs listed in FIG. 15 are examples, and the server-side game control programs include a large number of other programs.

In the data storage area 112b, a game-information storage unit 190, a player-information storage unit 191, and a lottery-information storage unit 192 are provided as storage units for storing data. Note that the storage units mentioned above are examples, and a large number of other storage units are provided in the data storage area 112b.

The CPU 110 runs the individual programs stored in the program storage area 112a to update the data in the individual storage units in the data storage area 112b. Then, by running the individual programs stored in the program storage area 112a, the CPU 110 causes the server 100 to function as a server-side game control unit 100A. The server-side game control unit 100A includes a game-execution control unit 180a, a battle-game execution unit 181a, a lottery unit 182a, an upper-limit-value setting unit 183a, a parameter change unit 184a, and a privilege assignment unit 185a.

Specifically, the CPU 110 runs the game-execution control program 180, thereby causing the computer to function as the game-execution control unit 180a. Similarly, the CPU 110 runs the battle-game execution program 181, the lottery program 182, the upper-limit-value setting program 183, the parameter change program 184, and the privilege assignment program 185, thereby causing the computer to function as the battle-game execution unit 181a, the lottery unit 182a, the upper-limit-value setting unit 183a, the parameter change unit 184a, and the privilege assignment unit 185a, respectively.

The game-execution control unit 180a controls the proceeding of the game as a whole. For example, upon receiving log-in information from the player terminal 1, the game-execution control unit 180a transmits the player information saved in the player-information storage unit 191 to the player terminal 1. Furthermore, in the case where game information concerning the game in general has been updated, the game-execution control unit 180a reads out the updated game information from the game-information storage unit 190 and transmits the game information to the player terminal 1.

The battle-game execution unit 181a is in charge of control for executing battle games.

The lottery unit 182a, when lottery request information has been transmitted (when a determination request operation has been performed) from the player terminal 1, executes a lottery process on the basis of the lottery request information (determination request operation) with reference to a selected lottery table.

The upper-limit-value setting unit 183a sets an upper limit value for advancing a character level (skill level) in accordance with the player level (specific condition).

The parameter change unit 184a, when an operation for changing (increasing) parameters has been performed via the ally-character detail screen, changes (increases) the parameters in accordance with the operation.

The privilege assignment unit 185a, in the case where a raising jade has been used and in the case where a subject character has been determined in "raising gacha", stores a free enhancement ID in association with that ally character. In this manner, the privilege assignment unit 185a assigns a privilege for increasing the parameters of the character for free up to specified values based on the free enhancement ID.

(Communication Processes Between Player Terminal 1 and Server 100)

Figure 16:
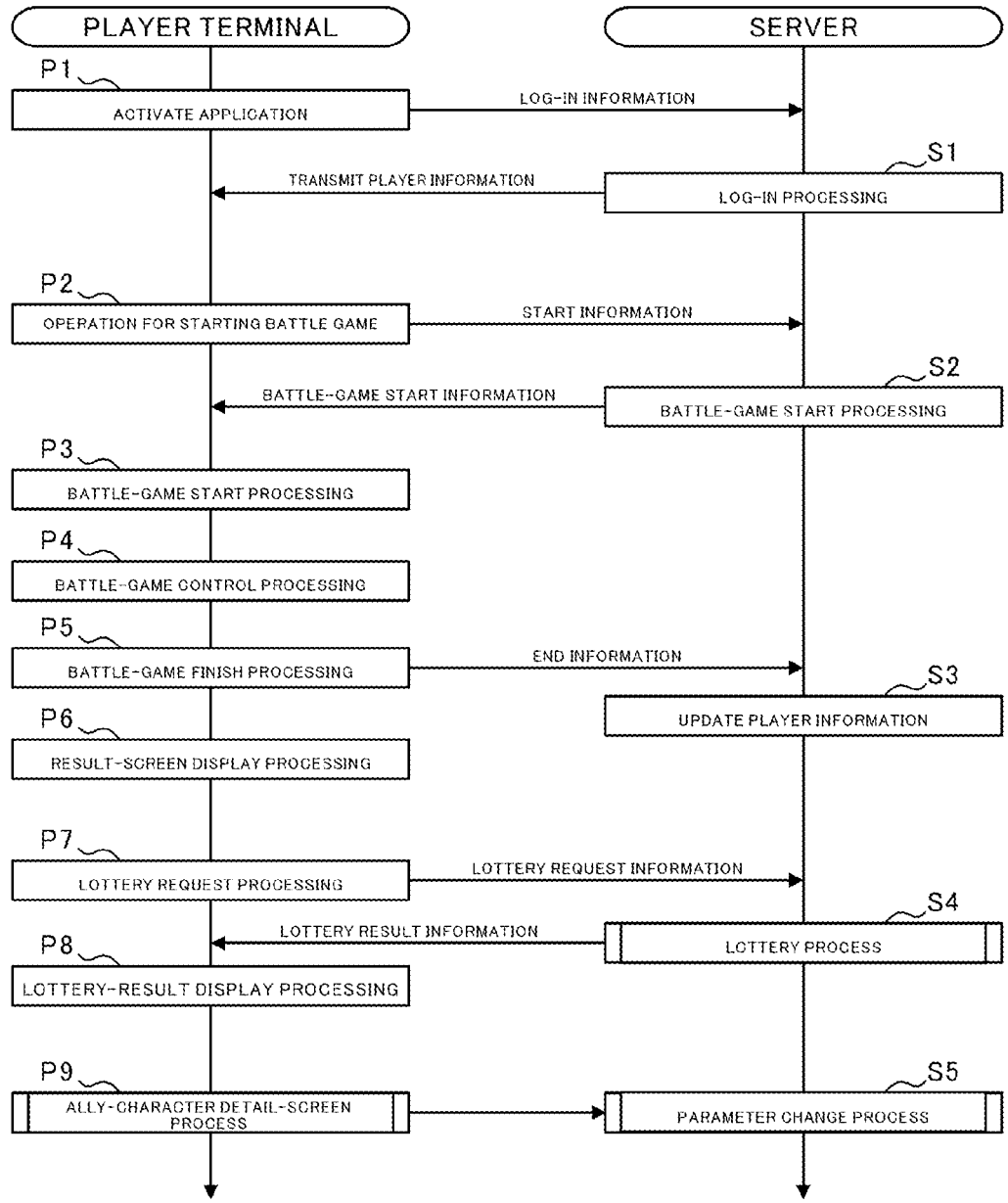
FIG. 16 is a sequence chart for explaining basic processes at the player terminal and the server.

FIG. 16 is a sequence chart for explaining basic processes of the player terminal 1 and the server 100. In the following description, processing steps at the player terminal 1 will be signified by Pn (n is an arbitrary integer). Furthermore, processing steps at the server 100 will be signified by Sn (n is an arbitrary integer). When the player has activated a game application at the player terminal 1 (P1), the game-execution control unit 80a transmits log-in information to the server 100. Upon receiving the log-in information, the game-execution control unit 180a of the server 100 identifies the player ID associated with the log-in information and executes log-in processing (S1). Here, the game-execution control unit 180a reads out the player information corresponding to the identified player ID from the player-information storage unit 191 and transmits the player information to the player terminal 1. Note that the player information includes the ally character database. Furthermore, the game-execution control unit 180*a* transmits gacha information indicating the types of gacha currently being held to the player terminal 1 on the basis of the holding period information of the individual gacha types, stored in the lottery-information storage unit 192. Furthermore, in the case where the game information stored in the game-information storage unit 190 has been changed, the game-execution control unit 180*a* transmits the changed game information to the player terminal 1. Note that the game information includes the free enhancement ID database.

Suppose that an operation for starting a battle game has been performed at the player terminal 1 (P2). In this case, start information is transmitted from the player terminal 1 to the server 100. Note that the start information includes party information selected by the player, type information of the battle game, etc. At the server 100, in response to the input of the start information, battle-game start information needed for starting the battle game is transmitted to the player terminal 1 (S2). Then, upon receiving the battle-game start information, the battle-game execution unit 81*a* of the player terminal 1 executes battle-game start processing for starting the battle game (P3). Here, for example, an area of the memory 12 for proceeding with the battle game is allocated, and prescribed programs are loaded from the storage unit 18 into the memory 12.

Then, the battle-game execution unit 81*a* of the player terminal 1 executes battle-game control processing for controlling the battle game (P4). In the battle-game control processing, update processing for updating various kinds of information is executed repeatedly on a per-frame basis. The number of frames is not particularly limited, and for example, the number of frames per second is 30 to 60. Therefore, during the battle game, information is updated approximately every 16 ms (milliseconds) to 33 ms at the player terminal 1.

Furthermore, when a condition for finishing the battle game is satisfied, the battle-game execution unit 81*a* of the player terminal 1 executes battle-game finish processing for finishing the battle game (P5). In the battle-game finish processing, for example, game result information is transmitted to the server 100. Furthermore, the display control unit 82*a* of the player terminal 1 displays a result screen on the display 26 (P6).

Upon acquiring the game result information, the battle-game execution unit 181*a* of the server 100 updates the player information (S3).

When a lottery operating part has been tapped in the gacha screen, the game-execution control unit 80*a* executes lottery request processing for transmitting lottery request information to the server 100 (P7). The lottery request information is configured so that the gacha type can be identified, and the lottery request information that is transmitted to the server 100 includes the following: the gacha type based on the gacha-type operating part selected in the gacha-type selection bar 52; and the number of lotteries and the amount of consumption of the second currency, corresponding to the tapped lottery operating part. Upon receiving the lottery request information, the lottery unit 182*a* of the server 100 executes a lottery process (S4) and transmits lottery result information indicating the result of lottery to the player terminal 1. Upon receiving the lottery result information, the display control unit 82*a* of the player terminal 1 displays the result of lottery indicated in the lottery result information (P8). The lottery process (S4) will be described later in detail.

Furthermore, in the case where an operation has been performed via the ally-character detail screen, the game-execution control unit 80*a* executes an ally-character detail-screen process (P9) for transmitting information corresponding to the operation to the server 100. At the server 100, a parameter change process (S5) for changing a parameter in accordance with the transmitted information is executed. The ally-character detail-screen process (P9) and the parameter change process (S5) will be described later in detail.

Figure 17:
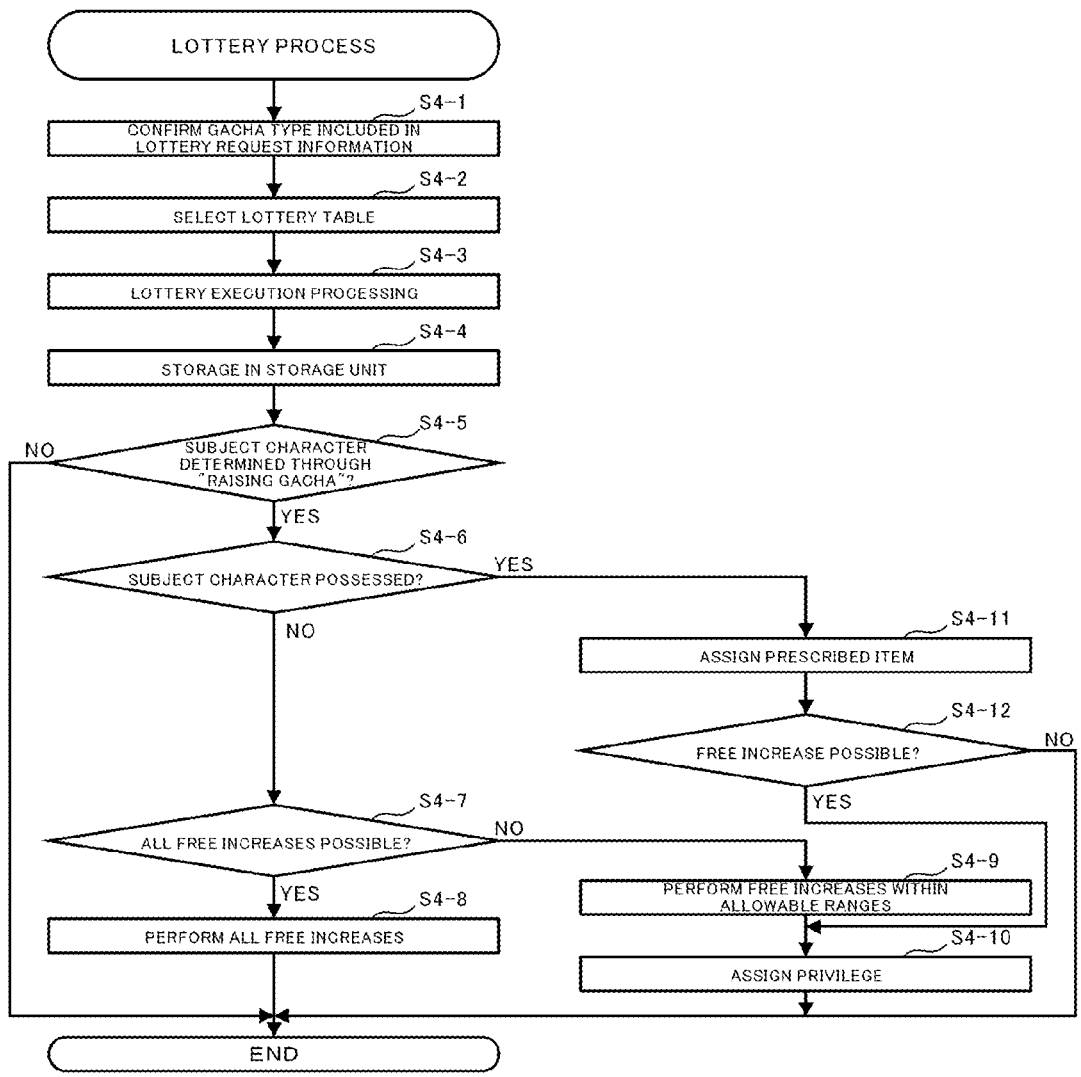
FIG. 17 is a flowchart for explaining a lottery process.

FIG. 17 is a flowchart for explaining the lottery process. As shown in FIG. 17, upon receiving lottery request information from the player terminal 1, the lottery unit 182*a* of the server 100 confirms the gacha type included in the lottery request information (S4-1), and selects the lottery table for the confirmed gacha type (S4-2). Then, the lottery unit 182*a* executes lottery execution processing for determining an item or an ally character through a lottery with reference to the selected lottery table (S4-3), and stores the ally character (ally character ID) or item determined through the lottery execution processing in the player-information storage unit 191 in association with the player ID (S4-4).

In the case where the gacha type is "raising gacha" and a subject character has been determined (YES in S4-5), on the basis of the free enhancement ID and player level associated with the subject character, as well as whether or not the subject character is possessed, the privilege assignment unit 185*a* assigns a privilege with which it is possible to increase the parameters of the subject character for free.

Specifically, in the case where the player does not possess the subject character, i.e., the ally character ID of the subject character is not associated with the player ID (NO in S4-6), the parameter change unit 184*a* checks whether or not it is possible to increase the values of all the parameters up to the values within which free increases are allowed, beyond the character level within which a free increase is allowed (S4-7). Then, in the case where it is possible to increase the values of all the parameters up to the values within which free increases are allowed (YES in S4-7), the parameter change unit 184*a* increases all the parameters up to the values set for the free enhancement ID (S4-8), and the game-execution control unit 180*a* assigns the subject character having the increased parameters to the player (associates the ally character ID with the player ID and updates the ally character database).

Meanwhile, in the case where it is not possible to increase all the parameters up to the values within which free increases are allowed (NO in S4-7), the parameter change unit 184*a* increases the parameters up to the values within which free increases are allowed (permissible ranges) (S4-9), and the privilege assignment unit 185*a* assigns a privilege for subsequently increasing the parameters for free (in the ally character database, stores the free enhancement ID in free enhancement IDb of the ally character ID of the subject character) (S4-10).

Meanwhile, in the case where the player possesses the subject character, i.e., in the case where the ally character ID of the subject character is associated with the player ID (YES in S4-6), the game-execution control unit 180*a* assigns a prescribed item to the player (stores a prescribed item in association with the player ID) (S4-11).

Furthermore, in the case where there is any parameter for which a free increase is allowed (YES in S4-12), the privilege assignment unit 185*a* assigns a privilege for subsequently increasing the parameter for free (in the ally character database, stores the free enhancement ID in free enhancement IDb of the ally character ID of the subject character) (S4-10).

Figure 18:
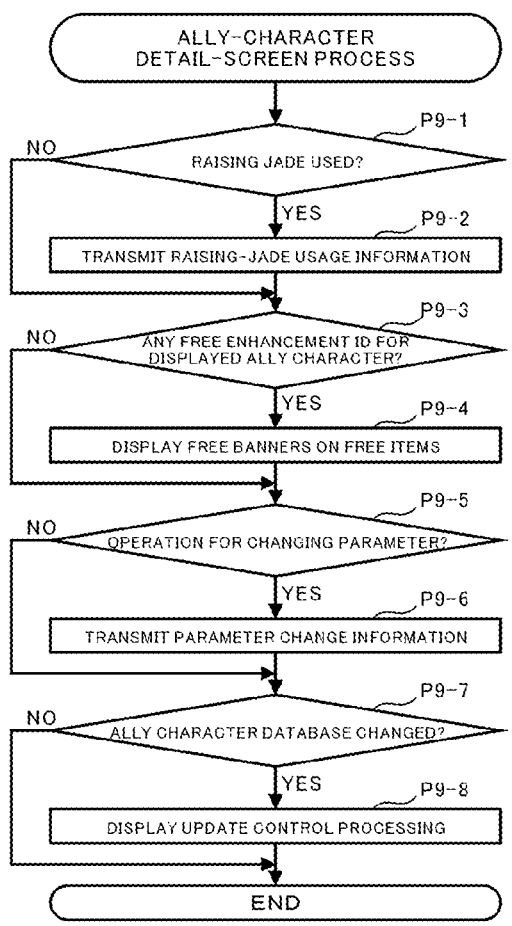
FIG. 18 is a flowchart for explaining an ally-character detail-screen process.

FIG. 18 is a flowchart for explaining an ally-character detail-screen process. When the ally-character detail-screen process is displayed on the display 26, the ally-character detail-screen process shown in FIG. 18 is executed. In the ally-character detail-screen process, in the case where a raising jade has been used via the raising-jade-list popup 55 shown in FIG. 9A, an equipment rank has been determined via the equipment-rank enhancement popup 56 shown in FIG. 9A, and the determination operating part 56b has been operated (YES in P9-1), the game-execution control unit 80a transmits raising-jade usage information to the server 100, the raising-jade usage information including the free enhancement ID associated with the raising jade used, the ally character for which the raising jade has been used, and the determined equipment rank (P9-2).

Meanwhile, in the case where, on the basis of the ally character database, a free enhancement ID is associated with the ally character to be displayed on the ally-character detail screen (YES in P-3), the display control unit 82a displays an ally-character detail screen on the display 26, such as the one shown in FIG. 10A or 11A (P9-4).

Furthermore, in the case where an operation for changing a parameter has been performed (YES in P9-5), the game-execution control unit 80a transmits parameter change information indicating the parameter to be changed to the server 100 (P9-6).

Furthermore, in the case where the ally character database has been changed (YES in P9-7), on the basis of the changed ally character database, the display control unit 82a updates and displays the ally-character detail screen, displays the free-equipment completion popup 60 shown in FIG. 10B, or displays the free-LV-enhancement completion popup 62 shown in FIG. 11B (P9-8).

Figure 19:
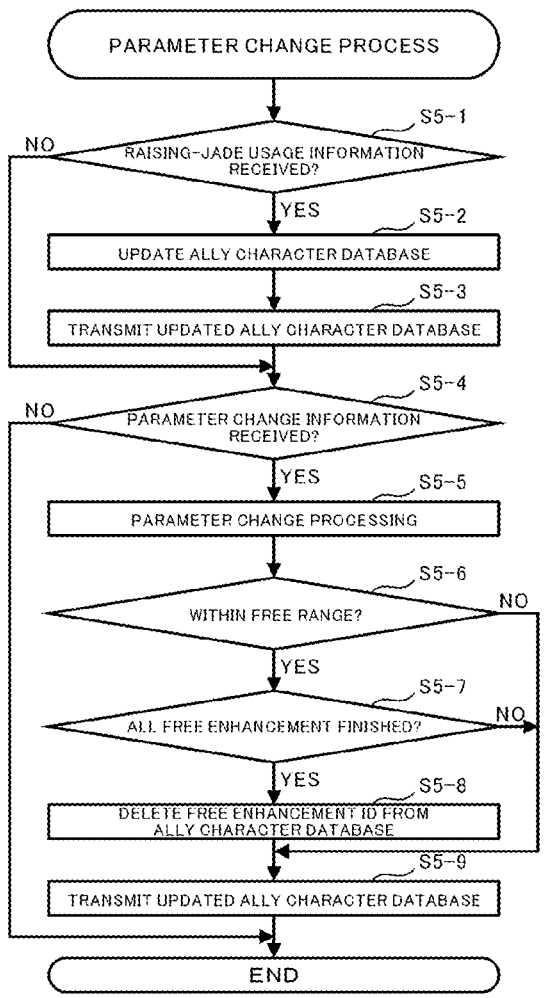
FIG. 19 is a flowchart for explaining a parameter change process.

FIG. 19 is a flowchart for explaining a parameter change process. Upon receiving raising-jade usage information (YES in S5-1), on the basis of the raising-jade usage information, the privilege assignment unit 185a updates the ally character database by storing the free enhancement ID in free enhancement Ida of the ally character ID (S5-2), and transmits the updated ally character database to the player terminal 1 (S5-3).

Furthermore, in the case where parameter change information has been received (YES in S5-4), the parameter change unit 184a changes (increases) the parameter for free if the change is within the range in which a free change is allowed, while changing the parameter by consuming an item or the like if the change is not within the range in which a free change is allowed (S5-5).

In the case where the parameter change is within the free range (S5-6), the privilege assignment unit 185a checks whether or not all free changes have been finished (S5-7). Then, in the case where all free changes have been finished (YES in S5-7), the privilege assignment unit 185a deletes the corresponding free enhancement ID from the ally character database (S5-8), and transmits the updated ally character database to the player terminal 1 (S5-9).

As described above, the player terminal 1 is provided with the game-execution control program 80, the battle-game execution program 81, and the display control program 82. Furthermore, the player terminal 1 includes the game-execution control unit 80a, the battle-game execution unit 81a, and the display control unit 82a. However, some or all of these programs and functional units may be provided in the server 100.

Furthermore, the server 100 is provided with the game-execution control program 180, the battle-game execution program 181, the lottery program 182, the upper-limit-value setting program 183, the parameter change program 184, and the privilege assignment program 185. Furthermore, the server 100 includes the game-execution control unit 180a, the battle-game execution unit 181a, the lottery unit 182a, the upper-limit-value setting unit 183a, the parameter change unit 184a, and the privilege assignment unit 185a. However, some or all of these programs and functional units may be provided in the player terminal 1.

Furthermore, in the embodiment described above, shared free enhancement IDs are associated with raising jades and subject characters of "raising gacha". However, free enhancement IDs associated with only raising jades or free enhancement IDs associated with only subject characters of "raising gacha" may be set.

Furthermore, parameters that are changed (increased) with only specific free enhancement IDs may be provided. Furthermore, the parameters that are increased for free in the embodiment described above are examples, and other parameters may be adopted.

Furthermore, as other examples of the prescribed condition in the embodiment described above, the proceeding of the game (e.g., clearing a prescribed event) or payment (a free enhancement ID is assigned directly without having to use a raising jade) may be set.

Furthermore, in the embodiment described above, parameters (e.g., the character level) are increased for free up to specified values based on a free enhancement ID. However, terms advantageous than usual are not limited to free, and items or the like to be enhanced may be discounted, such as decreasing items to be used or decreasing the amount of the in-game currency to be used.

Furthermore, in the embodiment described above, the privilege assignment unit 185a makes it possible to change parameters (e.g., the character level) to specified values based on a free enhancement ID in the case where a raising jade has been used or a subject character has been determined in "raising gacha", and assigns a privilege with which, in the case where the specified values exceed management upper limit values (the player level), it is possible to change the parameters up to the specified values even after the parameters have been changed up to the management upper limit values. Specifically, by associating a free enhancement ID to an ally character ID, a privilege with which it is possible to increase parameters up to specified values based on the free enhancement ID, irrespective of the player level, is assigned.

However, for example, it may be allowed to change parameters (e.g., the character level) to specified values based on a free enhancement ID by assigning, to the player, an amount of items with which the character level is increased to the specified values based on the free enhancement ID. At this time, the items that are assigned to the player may be the items shown in FIG. 4B, etc. or may be special items for free enhancement.

Alternatively, in the case where a raising jade has been used, parameters (e.g., the character level and equipment rank) may be forcibly increased as much as possible, and in the case where the specified values exceed upper limit values (e.g., management upper limit values or proceeding upper limit values), a privilege with which it is possible to change the parameters up to the specified values may be assigned.

Furthermore, although the above-described embodiment has been described in the context of the case where there is one subject character for "raising gacha", there may be a plurality of subject characters. For example, the subject characters may be all the ally characters.

Furthermore, the programs in the embodiment described above may be stored in a computer-readable storage medium and may be provided in the form of the storage medium. Alternatively, the programs may be provided in the form of a player terminal or an information processing system including the storage medium. Alternatively, the embodiment described above may be embodied in the form of an information processing method for realizing the individual functions and the steps shown in the flowcharts.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

A first aspect of the present disclosure includes a non-transitory computer-readable medium storing a program, wherein the program causes a computer to execute:
  setting an upper limit value for a parameter of a game object in accordance with a specific condition;
  changing the parameter within the upper limit value serving as a limit; and
  assigning, upon the satisfaction of a prescribed condition, a privilege with which it is possible to change the parameter of the game object up to a specified value on advantageous terms even in the case where the specified value exceeds the upper limit value.
In the first aspect,
  it may be made possible to change the parameter of the game object up to the specified value when, as the satisfaction of the prescribed condition, a prescribed game item has been used for the game object.
In the first aspect,
  it may be made possible to change the parameter of the game object up to the specified value corresponding to an effect of the game item.
In the first aspect,
  upon the satisfaction of the prescribed condition, it may be made possible to change the parameter of the game object up to the specified value for free.
In the first aspect,
  upon the satisfaction of the prescribed condition, an item that is needed for changing the parameter of the game object up to the specified value may be assigned.

A second aspect of the present disclosure includes an information processing method that is executed by at least one of a game terminal and a server that is able to carry out communication with the game terminal, the method including:
  setting an upper limit value for a parameter of a game object in accordance with a specific condition;
  changing the parameter within the upper limit value serving as a limit; and
  assigning, upon the satisfaction of a prescribed condition, a privilege with which it is possible to change the parameter of the game object up to a specified value on advantageous terms even in the case where the specified value exceeds the upper limit value.
In the second aspect,
  it may be made possible to change the parameter of the game object up to the specified value when, as the satisfaction of the prescribed condition, a prescribed game item has been used for the game object.
In the second aspect,
  it may be made possible to change the parameter of the game object up to the specified value corresponding to an effect of the game item.
In the second aspect,
  upon the satisfaction of the prescribed condition, it may be made possible to change the parameter of the game object up to the specified value for free.
In the second aspect,
  upon the satisfaction of the prescribed condition, an item that is needed for changing the parameter of the game object up to the specified value may be assigned.

A third aspect of the present disclosure includes an information processing system including a game terminal and a server that is able to carry out communication with the game terminal, wherein at least one of the game terminal and the server is configured to execute:
  setting an upper limit value for a parameter of a game object in accordance with a specific condition;
  changing the parameter within the upper limit value serving as a limit; and
  assigning, upon the satisfaction of a prescribed condition, a privilege with which it is possible to change the parameter of the game object up to a specified value on advantageous terms even in the case where the specified value exceeds the upper limit value.
In the third aspect,
  it may be made possible to change the parameter of the game object up to the specified value when, as the satisfaction of the prescribed condition, a prescribed game item has been used for the game object.
In the third aspect,
  it may be made possible to change the parameter of the game object up to the specified value corresponding to an effect of the game item.
In the third aspect,
  upon the satisfaction of the prescribed condition, it may be made possible to change the parameter of the game object up to the specified value for free.
In the third aspect,
  upon the satisfaction of the prescribed condition, an item that is needed for changing the parameter of the game object up to the specified value may be assigned.

What is claimed is:

1. A non-transitory computer readable medium storing a program causing a computer to execute a method comprising:
  storing, based on communicating over a communication network between a player terminal and a server, player information associated with a game player,
    wherein the player information comprises a player identification (ID) for the game player;
  setting an upper limit value for a parameter of a game object that is associated with the player ID;
  executing, using an input/output interface on the player terminal and communicating over the communication network between the player terminal and the server, a first computer game by the game player and based on the game object, the parameter, and the player information,
    wherein the game object is operated within the first computer game using the parameter according to a range that is specified by the upper limit value as a limit to the parameter; and
  storing, upon satisfaction of a prescribed condition while executing the first computer game, a privilege associated with the player ID and the game object within a database;

changing, based on communicating over the communication network between the player terminal and the server, the parameter to produce an updated parameter in response to using the privilege within an ally-character detail screen provided by the input/output interface, wherein changing the parameter comprises increasing the upper limit value in the updated parameter to a value that is equal to or more than a specified value, wherein the specified value of the parameter is set to the privilege, and wherein the parameter can be changed up to the specified value based on the stored privilege; and executing, using the input/output interface on the player terminal and communicating over the communication network between the player terminal and the server, a second computer game by the game player and based on the game object, the updated parameter, and the player information.

2. The non-transitory computer readable medium according to claim 1, wherein the parameter of the game object is changeable up to the specified value when, as the satisfaction of the prescribed condition, a prescribed game item has been used for the game object.

3. The non-transitory computer readable medium according to claim 2, wherein the parameter of the game object is changeable up to the specified value corresponding to an effect of the prescribed game item.

4. The non-transitory computer readable medium according to claim 3, wherein the parameter of the game object is changeable up to the specified value for free upon the satisfaction of the prescribed condition.

5. The non-transitory computer readable medium according to claim 3, wherein an item that is needed for changing the parameter of the game object up to the specified value is assigned upon the satisfaction of the prescribed condition.

6. The non-transitory computer readable medium according to claim 2, wherein the parameter of the game object is changeable up to the specified value for free upon the satisfaction of the prescribed condition.

7. The non-transitory computer readable medium according to claim 2, wherein an item that is needed for changing the parameter of the game object up to the specified value is assigned upon the satisfaction of the prescribed condition.

8. The non-transitory computer readable medium according to claim 1, wherein the parameter of the game object is changeable up to the specified value for free upon the satisfaction of the prescribed condition.

9. The non-transitory computer readable medium according to claim 1, wherein an item that is needed for changing the parameter of the game object up to the specified value is assigned upon the satisfaction of the prescribed condition.

10. An information processing method comprising:

storing, based on communicating over a communication network between a player terminal and a server, player information associated with a game player, wherein the player information comprises a player identification (ID) for the game player;

setting, by the server, an upper limit value for a parameter of a game object that is associated with the player ID;

executing, using an input/output interface on the player terminal and communicating over the communication network between the player terminal and the server, a first computer game by the game player and based on the game object, the parameter, and the player information, wherein the game object is operated within the first computer game using the parameter according to a range that is specified by the upper limit value as a limit to the parameter; and storing, upon satisfaction of a prescribed condition while executing the first computer game, a privilege associated with the player ID and the game object within a database;

changing, based on communicating over the communication network between the player terminal and the server, the parameter to produce an updated parameter in response to using the privilege within an ally-character detail screen provided by the input/output interface, wherein changing the parameter comprises increasing the upper limit value in the updated parameter to a value that is equal to or more than a specified value, wherein the specified value of the parameter is set to the privilege, and wherein the parameter can be changed up to the specified value based on the stored privilege; and executing, using the input/output interface on the player terminal and communicating over the communication network between the player terminal and the server, a second computer game by the game player and based on the game object, the updated parameter, and the player information.

11. An information processing system comprising:

a game terminal comprising an input/output interface; and a server that is configured to perform communication with the game terminal over a communication network, wherein the server is configured to perform a first method comprising:

storing, based on communicating over the communication network with the game terminal, player information associated with a game player, wherein the player information comprises a player identification (ID) for the game player;

setting an upper limit value for a parameter of a game object that is associated with the player ID;

wherein the game object is operated within a first computer game using the parameter according to a range that is specified by the upper limit value as a limit to the parameter;

storing, upon satisfaction of a prescribed condition while executing the first computer game, a privilege associated with the player ID and the game object within a database; and changing, based on communicating over the communication network with the game terminal, the parameter to produce an updated parameter in response to using the privilege within an ally-character detail screen provided by the input/output interface, wherein changing the parameter comprises increasing the upper limit value in the updated parameter to a value that is equal to or more than a specified value, wherein the specified value of the parameter is set to the privilege, and wherein the parameter can be changed up to the specified value based on the stored privilege; and
wherein the game terminal is configured to perform a second method comprising:
executing, using the input/output interface and through communicating over the communication network with the server, the first computer game by the game player and based on the game object, the parameter, and the player information; and
executing, using the input/output interface and through communicating over the communication network with the server, a second computer game by the game player and based on the game object, the updated parameter, and the player information.

12. A non-transitory computer readable medium storing a program causing a computer to execute a method comprising:
storing, based on communicating over a communication network between a player terminal and a server, player information associated with a game player,
wherein the player information comprises a player identification (ID) for the game player;
setting an upper limit value for a parameter of each of a plurality of game objects that are associated with the player ID;
executing, using an input/output interface on the player terminal and communicating over the communication network between the player terminal and the server, a first computer game by the game player and based on at least one game object among the plurality of game objects, the parameter, and the player information,
wherein the at least one game object is operated within the first computer game using the parameter according to a range that is specified by the upper limit value as a limit to the parameter; and
assigning, upon satisfaction of a prescribed condition that can be satisfied by each of the plurality of game objects while executing the first computer game, one or more items within a database;
changing, based on communicating over the communication network between the player terminal and the server, the parameter to produce an updated parameter in response to using the one or more items,
wherein changing the parameter comprises increasing the upper limit value in the updated parameter to a value that is equal to or more than a specified value,
wherein the specified value of the parameter is set to the one or more items, and
wherein the parameter can be changed up to the specified value based on using the one or more items; and
executing, using the input/output interface on the player terminal and communicating over the communication network between the player terminal and the server, a second computer game by the game player and based on the at least one game object, the updated parameter, and the player information.

13. An information processing method comprising:
storing, based on communicating over a communication network between a player terminal and a server, player information associated with a game player,
wherein the player information comprises a player identification (ID) for the game player;
setting, by the server, an upper limit value for a parameter of each of a plurality of game objects that are associated with the player ID;
executing, using an input/output interface on the player terminal and communicating over the communication network between the player terminal and the server, a first computer game by the game player and based on at least one game object among the plurality of game objects, the parameter, and the player information,
wherein the at least one game object is operated within the first computer game using the parameter according to a range that is specified by the upper limit value as a limit to the parameter; and
assigning, upon satisfaction of a prescribed condition that can be satisfied by each of the plurality of game objects while executing the first computer game, one or more items within a database;
changing, based on communicating over the communication network between the player terminal and the server, the parameter to produce an updated parameter in response to using the one or more items,
wherein changing the parameter comprises increasing the upper limit value in the updated parameter to a value that is equal to or more than a specified value,
wherein the specified value of the parameter is set to the one or more items, and
wherein the parameter can be changed up to the specified value based on using the one or more items; and
executing, using the input/output interface on the player terminal and communicating over the communication network between the player terminal and the server, a second computer game by the game player and based on the at least one game object, the updated parameter, and the player information.

14. An information processing system comprising:
a game terminal comprising an input/output interface; and
a server that is configured to perform communication with the game terminal over a communication network,
wherein the server is configured to perform a first method comprising:
storing, based on communicating over the communication network with the game terminal, player information associated with a game player,
wherein the player information comprises a player identification (ID) for the game player;
setting an upper limit value for a parameter of each of a plurality of game objects that are associated with the player ID;
wherein at least one game object among the plurality of game objects is operated within a first computer game using the parameter according to a range that is specified by the upper limit value as a limit to the parameter;
assigning, upon satisfaction of a prescribed condition that can be satisfied by each of the plurality of game objects while executing the first computer game, one or more items within a database; and
changing, based on communicating over the communication network with the game terminal, the parameter to produce an updated parameter in response to using the one or more items,
wherein changing the parameter comprises increasing the upper limit value in the updated parameter to a value that is equal to or more than a specified value,
wherein the specified value of the parameter is set to the one or more items, and
wherein the parameter can be changed up to the specified value based on using the one or more items; and
wherein the game terminal is configured to perform a second method comprising:
executing, using the input/output interface and through communicating over the communication network with the server, the first computer game by the game player and based on the at least one game object, the parameter, and the player information; and executing, using the input/output interface and through communicating over the communication network with the server, a second computer game by the game player and based on the at least one game object, the updated parameter, and the player information.

\* \* \* \* \*